United States Patent
Hamaguchi et al.

(10) Patent No.: US 10,819,914 B2
(45) Date of Patent: Oct. 27, 2020

(54) ILLUMINANCE SENSOR, PROXIMITY SENSOR, ELECTRONIC DEVICE, AND SURVEILLANCE SYSTEM

(71) Applicant: SHARP KABUSHIKI KAISHA, Sakai, Osaka (JP)

(72) Inventors: Kohji Hamaguchi, Sakai (JP); Takahiro Inoue, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/606,857

(22) PCT Filed: Feb. 20, 2018

(86) PCT No.: PCT/JP2018/006059
§ 371 (c)(1),
(2) Date: Oct. 21, 2019

(87) PCT Pub. No.: WO2018/198502
PCT Pub. Date: Nov. 1, 2018

(65) Prior Publication Data
US 2020/0137283 A1 Apr. 30, 2020

(30) Foreign Application Priority Data

Apr. 25, 2017 (JP) .................. 2017-086484

(51) Int. Cl.
*H04N 5/235* (2006.01)
*G01J 1/44* (2006.01)
*H04M 1/02* (2006.01)

(52) U.S. Cl.
CPC .............. *H04N 5/2352* (2013.01); *G01J 1/44* (2013.01); *H04M 1/0264* (2013.01); *H04M 2250/52* (2013.01)

(58) Field of Classification Search
CPC .................................................... H04N 5/2352
USPC ...................................................... 348/227.1
See application file for complete search history.

(56) References Cited

U.S. PATENT DOCUMENTS

2010/0079441 A1*  4/2010  Sasaki .................. G09G 3/3648
                                                        345/213
2015/0163392 A1    6/2015  Malone et al.

FOREIGN PATENT DOCUMENTS

JP        2011-209236 A    10/2011
JP        2017-501627 A    1/2017

* cited by examiner

*Primary Examiner* — Joel W Fosselman
(74) *Attorney, Agent, or Firm* — ScienBiziP, P.C.

(57) ABSTRACT

An illuminance sensor detects a flicker with higher accuracy than in the related art. The illuminance sensor includes: a light receiving unit that receives light and outputs a current; a flicker measurement counter circuit that performs AD conversion on the current and outputs a first digital signal to a flicker measurement storage device; an illuminance measurement counter circuit that performs AD conversion on the current and outputs a second digital signal to an illuminance measurement storage device; and a flicker detection unit that detects a flicker by analyzing the first digital signal stored in the flicker measurement storage device. A cycle during which the first digital signal is output from the flicker measurement counter circuit is shorter than a cycle during which the second digital signal is output from the illuminance measurement counter circuit.

13 Claims, 17 Drawing Sheets

ILLUMINANCE SENSOR, PROXIMITY SENSOR, ELECTRONIC DEVICE, AND SURVEILLANCE SYSTEM

TECHNICAL FIELD

An aspect of the present invention relates to an illuminance sensor or the like that detects illuminance of light.

BACKGROUND ART

In recent years, a mobile electronic device (for example, a smartphone) including a camera (an image capturing device) has been widely used. For this reason, in a case where an image (picture) is captured using the electronic device, various studies have been made to improve a quality of the image.

As an example, PTL 1 discloses a technique for preventing degradation in image quality due to a flicker (to be described in detail). Specifically, in an electronic device described in PTL 1, an image sensor (image capturing element) has a function of detecting a flicker.

CITATION LIST

Patent Literature

PTL 1: Japanese Unexamined Patent Application Publication (Translation of PCT Application) No. 2017-501627 (published on Jan. 12, 2017)

PTL 2: Japanese Unexamined Patent Application Publication No. 2011-209236 (published on Oct. 20, 2011)

SUMMARY OF INVENTION

Technical Problem

However, as will be described below, there is still room for improvement in a method for detecting a flicker. An object of an aspect of the present invention is to provide an illuminance sensor that detects a flicker with higher accuracy than in the related art.

Solution to Problem

In order to solve the problem, according to an aspect of the present invention, there is provided an illuminance sensor as an illuminance sensor that detects illuminance of light, the illuminance sensor including: a light receiving unit that receives the light and outputs an electrical signal; a first counter that performs AD conversion on the electrical signal and outputs a first digital signal as an index of a flicker of the light; a second counter that performs AD conversion on the electrical signal and outputs a second digital signal as an index of illuminance of the light; a first storage unit that stores the first digital signal output from the first counter; a second storage unit that stores the second digital signal output from the second counter; and a flicker detection unit that detects an occurrence of a flicker by analyzing the first digital signal stored in the first storage unit, in which a cycle during which the first digital signal is output from the first counter is shorter than a cycle during which the second digital signal is output from the second counter.

Further, in order to solve the problem, according to another aspect of the present invention, there is provided an illuminance sensor as an illuminance sensor that detects illuminance of light, the illuminance sensor including: a light receiving unit that receives the light and outputs an electrical signal; a first counter that performs AD conversion on the electrical signal and outputs a first digital signal as an index of a flicker of the light; a second counter that performs AD conversion on the electrical signal and outputs a second digital signal as an index of illuminance of the light; a first storage unit that stores the first digital signal output from the first counter; a second storage unit that stores the second digital signal output from the second counter; and an output unit that outputs the first digital signal stored in the first storage unit to the outside of the illuminance sensor, in which a cycle during which the first digital signal is output from the first counter is shorter than a cycle during which the second digital signal is output from the second counter.

Advantageous Effects of Invention

According to the illuminance sensor of the aspect of the present invention, it is possible to detect a flicker with higher accuracy than in the related art.

DESCRIPTION OF EMBODIMENTS

Reference Embodiment

First, prior to description of an embodiment 1, a reference embodiment will be described. The reference embodiment is an embodiment for explaining a point in which there is room for improvement in the related art. Hereinafter, the reference embodiment will be described with reference to FIGS. 11 to 18.

Figure 11:
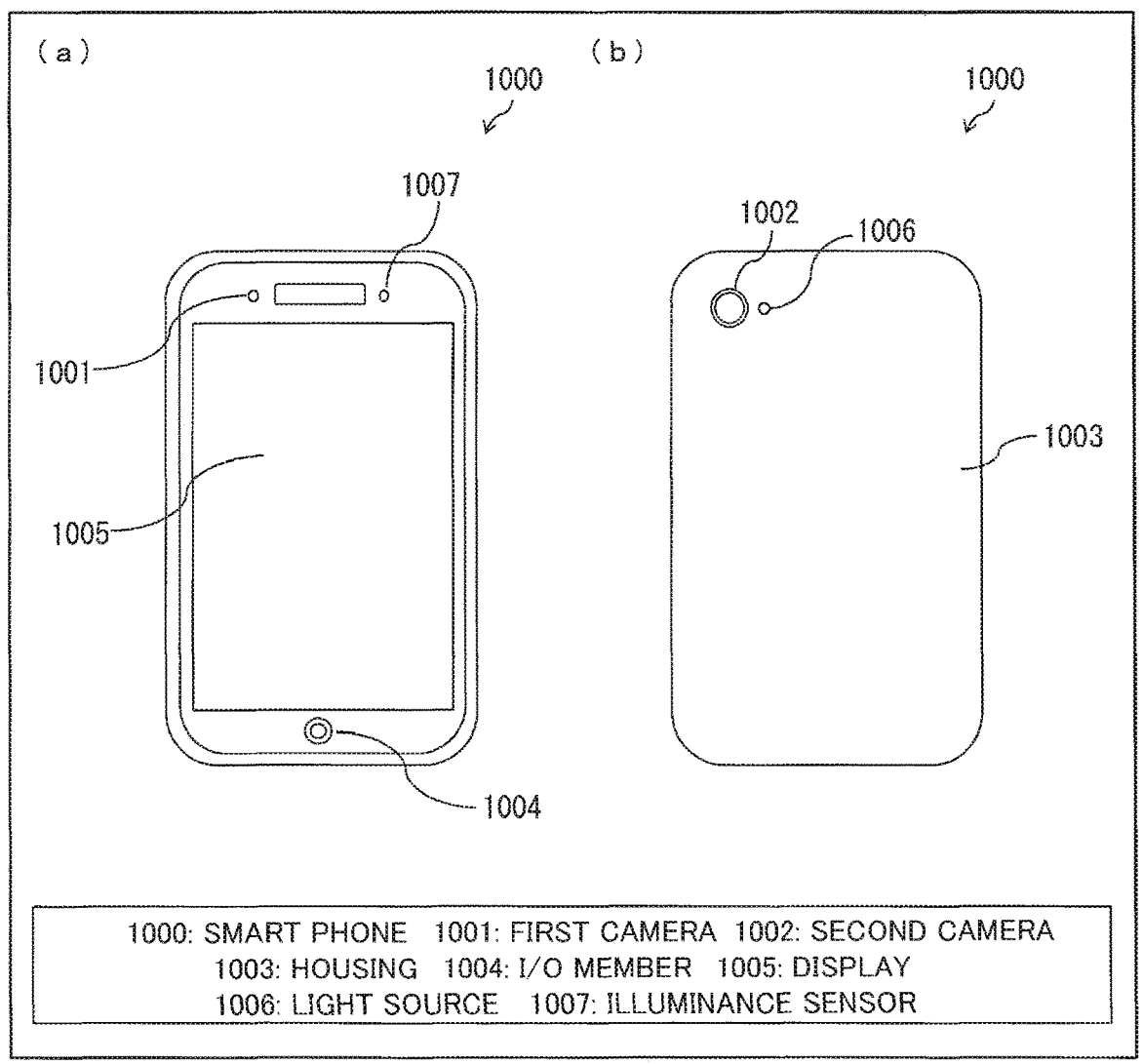
FIG. 11 is a view illustrating an appearance of a smartphone according to a reference embodiment, (a) is a front view, and (b) is a rear view.

FIG. 11 is a view illustrating an appearance of a smartphone 1000 (electronic device) in the related art (PTL 1). In FIG. 11, (a) is a front view of the smartphone 1000, and (b) is a rear view of the smartphone 1000. As described below, the smartphone 1000 is configured to be able to detect a flicker using an image sensor (image caturing element) of a camera.

(Flicker)

First, a relationship between a quality of an image captured by a camera and a flicker will be described. A flicker means a phenomenon in which a light source (for example, a fluorescent lamp or an incandescent lamp) driven by a power source (AC power source) blinks at a frequency twice the frequency of the power source. The frequency of the power source means the frequency of a voltage or a current output from the power source.

For example, in a case where the frequency of the power source is 50 Hz, the light source repeats blinking at a frequency of 100 Hz (in a cycle of 10 ms). That is, a flicker with a frequency of 100 Hz occurs. In addition, in a case where the frequency of the power source is 60 Hz, the light source repeats blinking at a frequency of 120 Hz (in a cycle 8.3 ms). That is, a flicker with a frequency of 120 Hz occurs. Hereinafter, (i) a frequency of a flicker is also referred to as a flicker frequency, and (ii) a cycle of a flicker is also referred to as a flicker cycle. A flicker cycle is the reciprocal of a flicker frequency.

In a case where an image is captured outdoors (in a case where the light source is not limited to a fluorescent lamp or an incandescent lamp), a quality of the image is not significantly influenced by a flicker. On the other hand, in a case where an image is captured indoors (in a case where the light source is likely to be limited to a fluorescent lamp or an incandescent lamp), a quality of the image may be degraded by a flicker. Hereinafter, this point will be described.

A flicker cycle is so short that a flicker cannot be recognized by human eyes. For this reason, even when a flicker occurs, a person recognizes (visually recognizes or perceives) that the light source is always turned on with the same brightness (illuminance). On the other hand, in a case where an image is captured by a camera, a quality of the image is greatly influenced by a flicker depending on an exposure time of the camera.

For example, depending on a capturing timing, the captured image may be an image that is darker than intended by a user (a person by whom capturing is performed). Alternatively, the captured image may be an image that is brighter than intended by the user. That is, even though the user intends to perform capturing under the same brightness condition, an image having brightness (quality) that is unintended by the user may be obtained. In this way, a flicker may cause degradation in image quality.

As a method for avoiding degradation in image quality caused by a flicker, a method of setting the exposure time of the camera to an integer multiple of a flicker cycle may be used. As long as the exposure time of the camera is set in this way, an amount of light received by the camera during the exposure time is averaged, and as a result, regardless of the capturing timing, an image having the same quality can be captured.

For example, in a case where a flicker cycle is 10 ms (a flicker frequency is 100 Hz), the exposure time of the camera may be set to an integer multiple of 10 ms. In addition, in a case where a flicker cycle is 8.3 ms (a flicker frequency is 120 Hz), the exposure time of the camera may be set to an integer multiple of 8.3 ms.

On the other hand, as described above, a flicker cannot be recognized by eyes of the user (human). For this reason, the user cannot determine the presence or absence of a flicker, and as a result, the user cannot change the exposure time of the camera.

Further, in Japan, a frequency (commercial frequency) of the AC power source varies depending on regions, and either of 50 Hz or 60 Hz is used. Unless information indicating such a frequency difference is presented, the user cannot recognize the frequency difference. For this reason, it is difficult for the user to recognize the frequency difference and change the exposure time of the camera according to a flicker frequency (flicker cycle).

Based on the above points, the smartphone 1000 has a function of detecting the presence and absence of a flicker of a light source and a flicker frequency of the light source so as to automatically change the exposure time of the camera. Hereinafter, a configuration of the smartphone 1000 will be described.

(Smartphone 1000)

As illustrated in FIG. 11, the smartphone 1000 includes a first camera 1001, a second camera 1002, a housing 1003, an input/output (I/O) member 1004, a display 1005, a light source 1006, and an illuminance sensor 1007. The light source 1006 is used for flash capturing of the cameras (first camera 1001 and second camera 1002). The illuminance sensor 1007 is an illuminance sensor in the related art. The illuminance sensor 1007 will be described in detail later.

Figure 12:
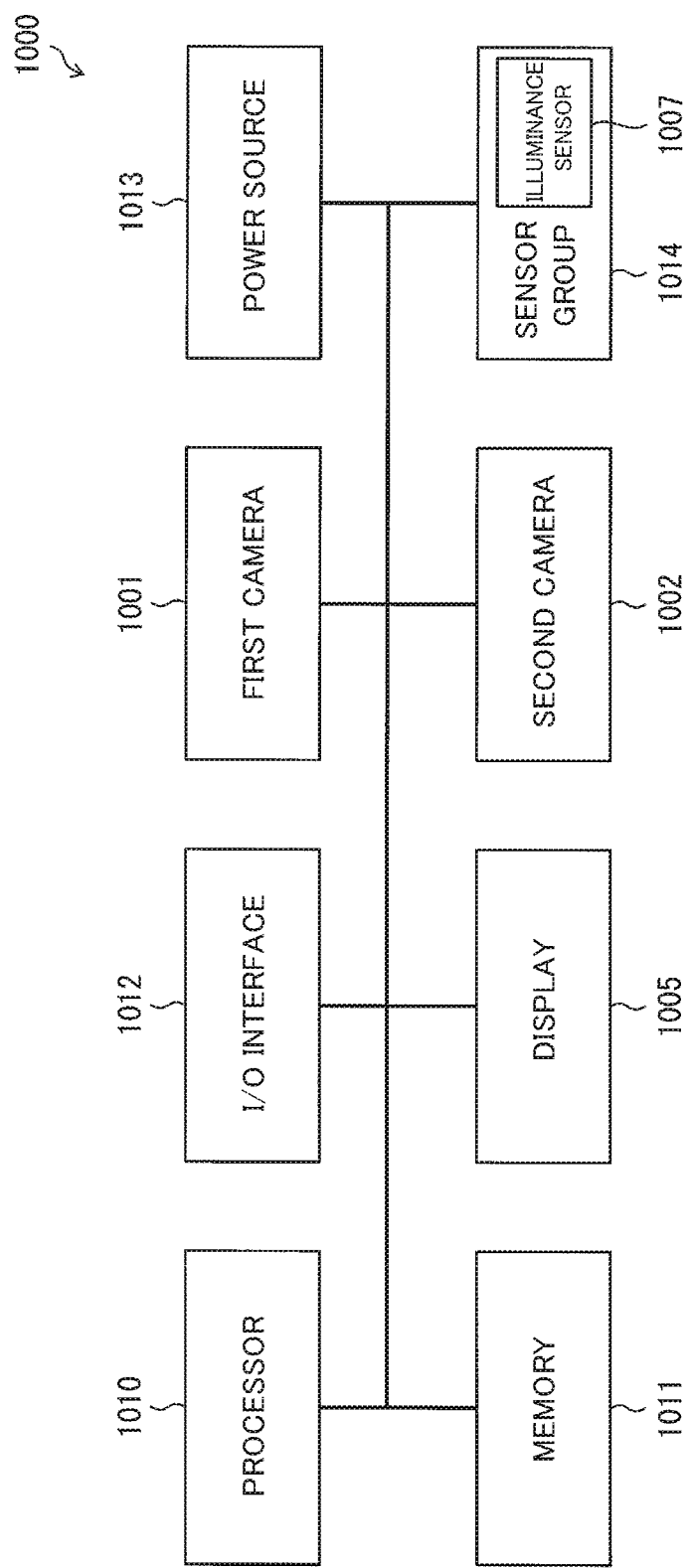
FIG. 12 is a functional block diagram schematically illustrating a configuration of the smartphone of FIG. 11.

FIG. 12 is a functional block diagram schematically illustrating a configuration of the smartphone 1000. The smartphone 1000 includes a processor 1010, a memory 1011, an I/O interface 1012, a power source 1013, and a sensor group 1014 in addition to the members illustrated in FIG. 11. As illustrated in FIG. 12, the illuminance sensor 1007 is included in the sensor group 1014.

It is assumed that the smartphone 1000 further includes known members (not illustrated) that are common to a smartphone (electronic device) in addition to the members illustrated in FIGS. 11 and 12. In addition, the electronic device is not limited to a smartphone, and may be, for example, a tablet terminal.

Figure 13:
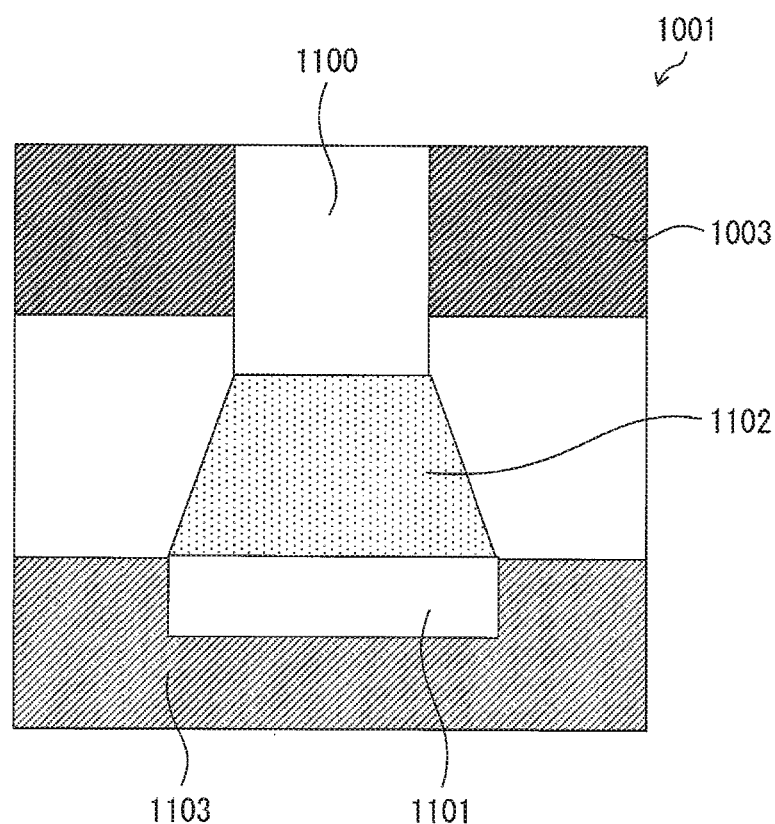
FIG. 13 is a sectional view schematically illustrating a configuration of a camera of the smartphone of FIG. 11.

FIG. 13 is a sectional view schematically illustrating a configuration of the first camera 1001 (camera). In the first camera 1001, an image sensor 1101 is formed on a silicon-based substrate 1103. The first camera 1001 includes an imaging stage 1100.

The imaging stage 1100 optically communicates with the image sensor 1101. In addition, the imaging stage 1100 is connected to the housing 1003 so as to be movable, and is disposed in front of the image sensor 1101. The imaging stage 1100 may further include members such as a lens, a filter, a diaphragm, and a shutter.

The imaging stage 1100 allows light 1102 to be focused or transmitted onto the image sensor 1101 within a visual field thereof. The image sensor 1101 (captures) an image by converting the light 1102 incident on the image sensor 1101 into an electrical signal. Each unit of the imaging stage 1100 and the image sensor 1101 is controlled by a signal supplied from, for example, the processor 1010 or the memory 1011.

Figure 14:
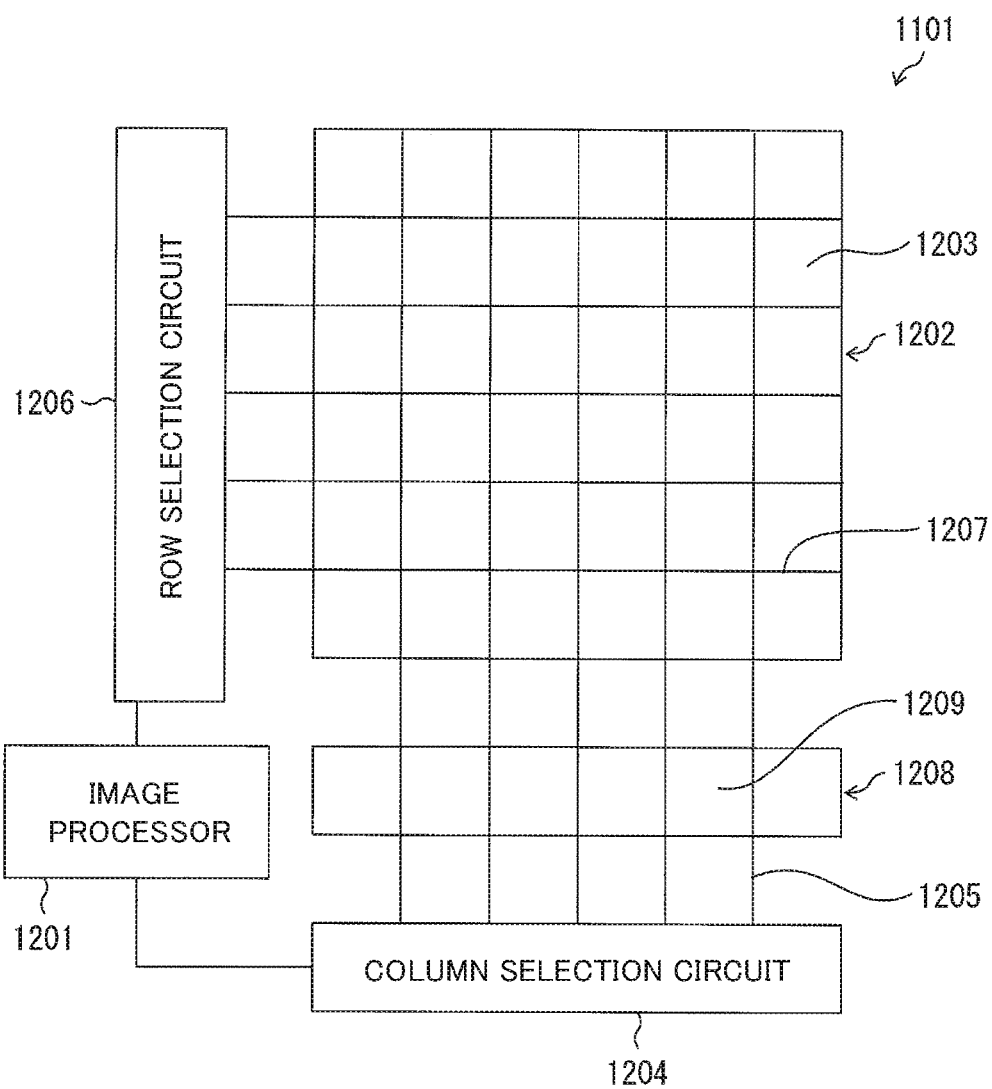
FIG. 14 is a diagram schematically illustrating a configuration of an image sensor of the smartphone of FIG. 11.

FIG. 14 is a diagram schematically illustrating a configuration of the image sensor 1101. The image sensor 1101 includes an image processor 1201 and an imaging area 1202. The imaging area 1202 is provided as a pixel array including pixels 1203. The pixel array is generally arranged in a matrix shape in a row direction and a column direction.

The imaging area 1202 can be connected to a column selection circuit 1204 via one or more column selection lines 1205, Further, the imaging area 1202 can communicate with a row selection circuit 1206 via one or more row selection lines 1207.

The row selection circuit 1206 selects a pixel group including (i) one pixel 1203 in a specific row or (ii) a plurality of pixels 1203 in a specific row (for example, all pixels 1203 in a specific row).

The column selection circuit 1204 selects a pixel group including (i) one pixel 1203 in a specific column, or (ii) a plurality of pixels 1203 in a special column (for example, all pixels 1203 in a specific column). The column selection circuit 1204 receives data output from the selected pixel 1203 or pixel group.

The row selection circuit 1206 and the column selection circuit 1204 can communicate with the image processor 1201. The image processor 1201 processes data which is acquired from the pixel 1203 via the column selection circuit 1204. The image processor 1201 provides the processed data to (i) the processor 1010 or (ii) other functional units (members) of the smartphone 1000.

The image processor 1201 may be incorporated in the processor 1010. That is, the function of the image processor 1201 may be shared with the processor 1010. On the other hand, the image processor 1201 may be provided as a separate member from the processor 1010.

In the image sensor 1101, a flicker detection area 1208 is disposed adjacent to the imaging area 1202. In the example of FIG. 14, the flicker detection area 1208 is disposed below the imaging area 1202 such that the flicker detection area 1208 is adjacent to the imaging area 1202.

The flicker detection area 1208 includes a flicker detection pixel 1209. The flicker detection pixel 1209 samples a specific area of the image, and detects a flicker. One flicker detection area 1208 may be provided, or a plurality of flicker detection areas 1208 may be provided. Further, one flicker detection pixel 1209 may be provided, or a plurality of flicker detection pixels 1209 may be provided.

(Example of Processing of Detecting Flicker in Smartphone 1000)

Figure 15:
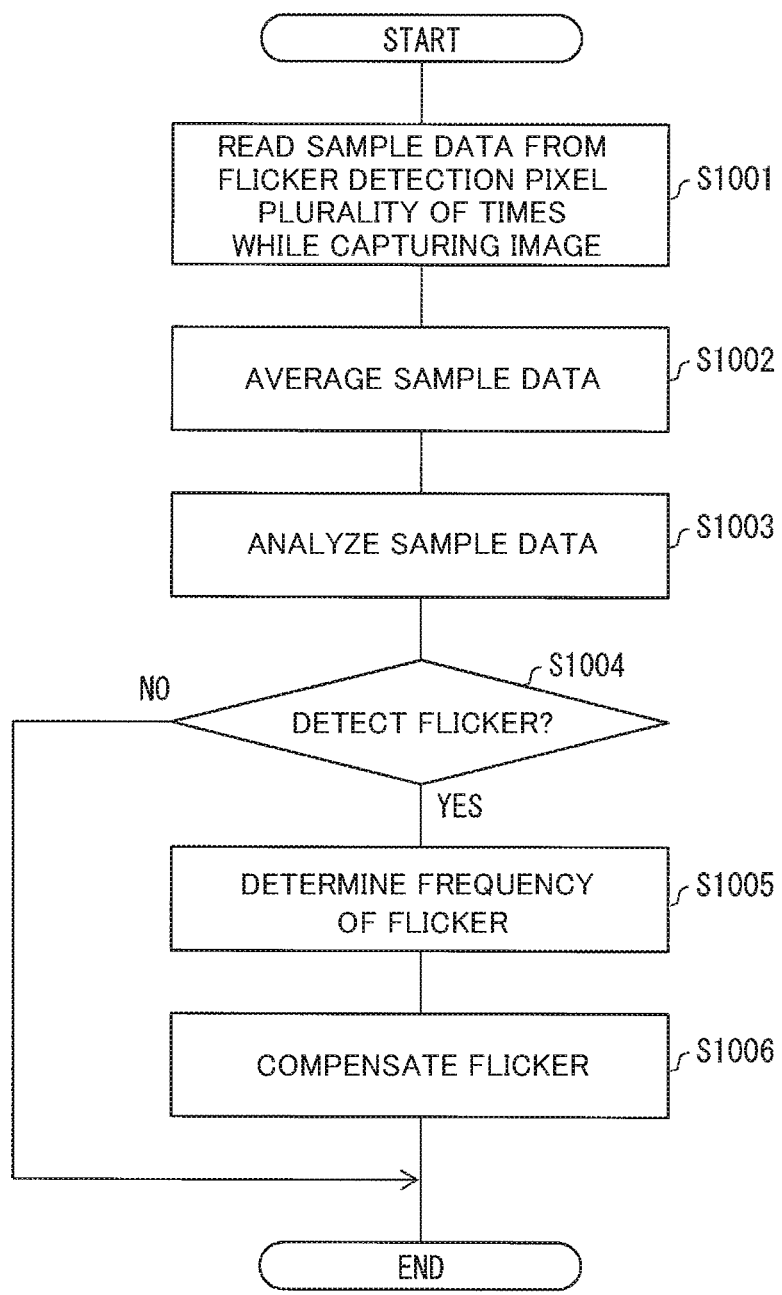
FIG. 15 is a diagram illustrating a flow of processing by which the smartphone of FIG. 11 detects a flicker using the image sensor.

FIG. 15 is a flowchart illustrating a flow of processing S1001 to S1006 in which the smartphone 1000 detects a flicker using the image sensor 1101 (that is, a flow of flicker detection processing in PTL 1). First, charges are accumulated in the flicker detection pixel 1209 of the flicker detection area 1208.

While the image is captured by the pixels 1203 in the imaging area 1202, sample data is read from the flicker detection pixel 1209 a plurality of times (S1001). The processor 1010 averages the sample data (S1002). Processing of S1002 may be executed by the image processor 1201. The same applies to subsequent processing.

Next, the processor 1010 analyzes (examines) the averaged sample data (hereinafter, referred to as average sample data) so as to determine whether or not a flicker exists in the imaging environment (S1003). For example, the processor 1010 may analyze the average sample data by performing a Fourier transform on the average sample data.

Alternatively, the processor 1010 may analyze the average sample data by calculating a degree of correlation between the average sample data and a known flicker pattern. Alternatively, the processor 1010 may analyze the average sample data by calculating a time interval between the local maximum point and the local minimum point in the average sample data.

The processor 1010 determines whether or not a flicker occurs (that is, whether or not a flicker is detected) based on the analysis result of the average sample data (S1004). In a case where the analysis result of the average sample data indicates that a flicker does not occur (NO in S1004), the process is ended.

On the other hand, in a case where the analysis result of the average sample data indicates that a flicker occurs (YES in S1004), the processor 1010 determines (detects) a flicker frequency based on the analysis result of the average sample data (S1005). Next, the processor 1010 compensates the flicker according to the flicker frequency (S1006). For example, the processor 1010 adjusts the exposure time of the first camera 1001 so as to reduce the flicker in the image.

(Illuminance Sensor 1007)

An electronic device such as the smartphone 1000 generally includes a plurality of sensors (for example, the sensor group 1014) including the illuminance sensor 1007. In such an electronic device, in order to reduce power consumption, brightness of a display (for example, the display 1005) is generally adjusted according to ambient brightness (illuminance of ambient light). The illuminance sensor 1007 is used to detect the illuminance. For this reason, in the smartphone 1000, the illuminance sensor 1007 is disposed near the display 1005.

Figure 16:
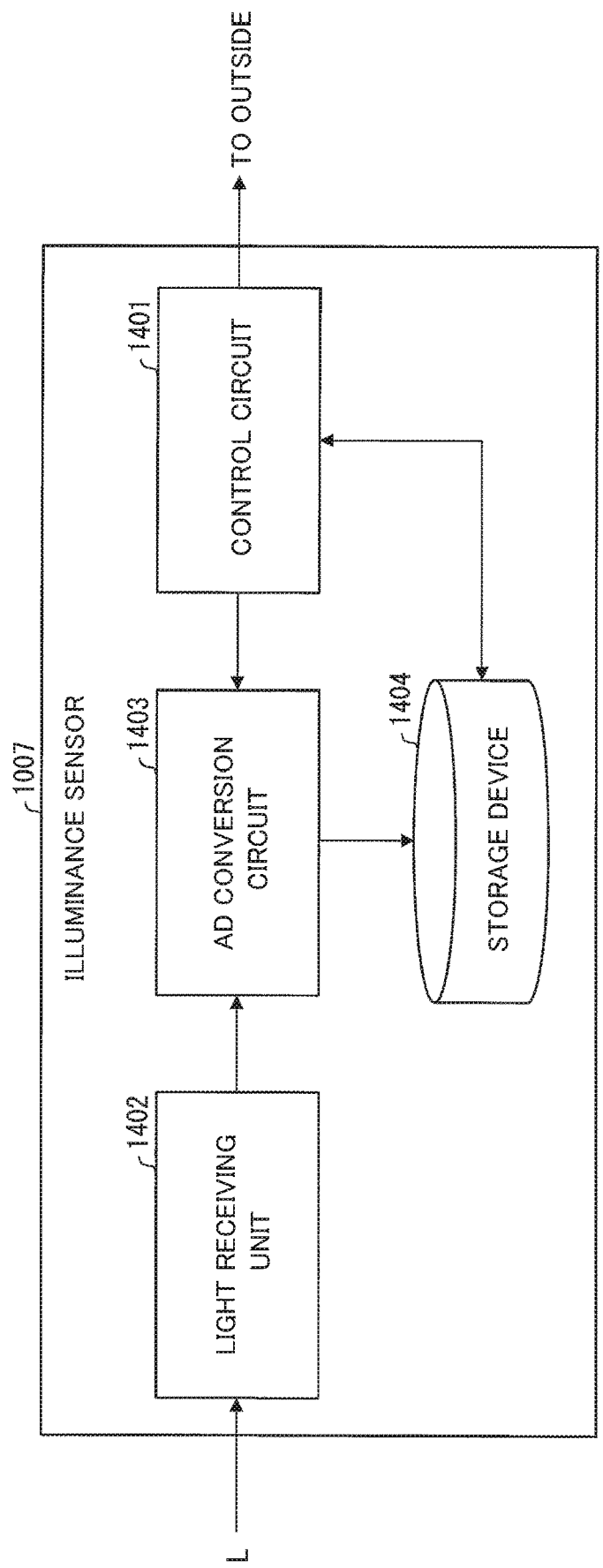
FIG. 16 is a functional block diagram schematically illustrating a configuration of an illuminance sensor of the smartphone of FIG. 11.

Next, a configuration of the illuminance sensor 1007 (illuminance sensor in the related art) will be described. FIG. 16 is a functional block diagram schematically illustrating a configuration of the illuminance sensor 1007. The illuminance sensor 1007 includes a control circuit 1401, a light receiving unit 1402, an analog-digital (AD) conversion circuit 1403, and a storage device 1404.

When an operation of the illuminance sensor 1007 is started, the control circuit 1401 operates the AD conversion circuit 1403. The light receiving unit 1402 receives light L incident on the illuminance sensor 1007 from the outside. The light receiving unit 1402 is configured with a photoelectric conversion element such as a photodiode.

The light receiving unit 1402 detects (receives) the light L and generates an electrical signal. For example, the light receiving unit 1402 detects the light L and generates a current (photocurrent) (hereinafter, current Iin) as an electrical signal. The current Iin is input to the AD conversion circuit 1403.

The AD conversion circuit 1403 accumulates charges by the current Iin supplied from the light receiving unit 1402. The AD conversion circuit 1403 detects the accumulated charge amount, and converts the charge amount into a digital signal. In this manner, the AD conversion circuit 1403 can output a digital signal having a correlation relationship with intensity (illuminance) of the light L, to the outside.

Figure 17:
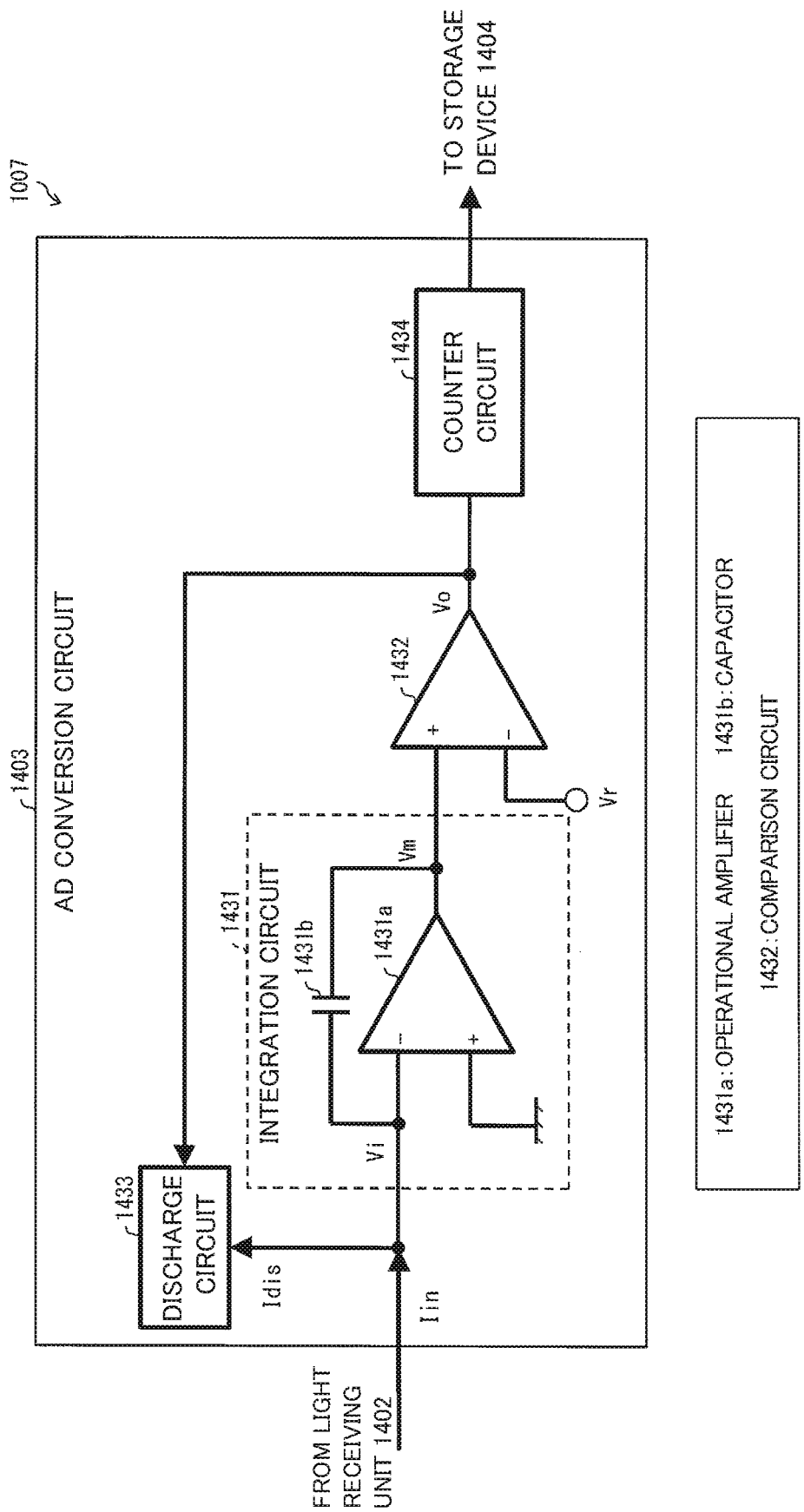
FIG. 17 is a circuit diagram illustrating a configuration of an AD conversion circuit of the smartphone of FIG. 11.

FIG. 17 is a circuit diagram illustrating a configuration of the AD conversion circuit 1403 in the related art (PTL 2). The AD conversion circuit 1403 includes an integration circuit 1431, a comparison circuit 1432, a discharge circuit 1433, and a counter circuit 1434.

The integration circuit 1431 includes an operational amplifier 1431*a* which has two inputs and one output and a capacitor 1431*b*. Two terminals of the capacitor 1431*b* are respectively connected to a negative input terminal of the operational amplifier 1431*a* and an output terminal of the operational amplifier 1431*a*.

Hereinafter, a voltage (potential) of the negative input terminal of the operational amplifier 1431*a* is referred to as a voltage Vi. Further, a voltage of the output terminal of the operational amplifier 1431*a* is referred to as a voltage Vm. A positive input terminal of the operational amplifier 1431*a* is grounded. The output terminal of the operational amplifier 1431*a* is connected to a positive input terminal of the comparison circuit 1432.

The negative input terminal of the operational amplifier 1431*a* is connected to the light receiving unit 1402, and the current Iin is supplied (input) to the negative input terminal of the operational amplifier 1431*a*. The negative input terminal of the operational amplifier 1431*a* is also connected to the discharge circuit 1433.

When the current Iin is supplied to the integration circuit 1431, charges are accumulated in the capacitor 1431*b* by the current Iin. As a result, as the charge amount accumulated in the capacitor 1431*b* increase, the voltage Vm as the output of the integration circuit 1431 increases. Hereinafter, the charges accumulated in the capacitor 1431*b* are referred to as accumulated charges. Further, an amount of the accumulated charges is referred to as an accumulated charge amount.

The comparison circuit 1432 is a comparator which has two inputs and one output. According to the above-described circuit configuration, the voltage Vm is supplied to the positive input terminal of the comparison circuit 1432. Further, a reference voltage as a constant voltage is applied to a negative input terminal of the comparison circuit 1432. Hereinafter, the reference voltage is represented as Vr. The voltage Vr is determined in consideration of the power source voltage of the AD conversion circuit 1403, characteristics of the comparison circuit 1432, and the like. In the reference embodiment, it is assumed that Vr=1V.

In addition, an output terminal of the comparison circuit 1432 is connected to each of the counter circuit 1434 and the discharge circuit 1433. Hereinafter, a voltage of the output terminal of the comparison circuit 1432 is referred to as a voltage Vo.

The comparison circuit 1432 outputs the voltage Vo as a digital value according to a difference between the voltage Vm and the voltage Vr (hereinafter, referred to as a voltage ΔV). That is, the comparison circuit 1432 compares the voltage Vm and the voltage Vr, and outputs the voltage Vo corresponding to the comparison result.

Specifically, in a case where ΔV≥0V (that is, in a case where Vm≥Vr=1V), the comparison circuit 1432 outputs the voltage Vo=VH. The voltage VH is a high level voltage (high level value), and corresponds to a digital value "1". In other words, in a case where ΔV≥0V, the comparison circuit 1432 outputs a digital value 1.

On the other hand, in a case where ΔV<0V (that is, in a case where Vm<Vr=1V), the comparison circuit 1432 outputs the voltage Vo=VL. The voltage VL is a low level voltage (low level value), and corresponds to a digital value "0". In other words, in a case where ΔV<0V, the comparison circuit 1432 outputs a digital value 0.

The voltage Vo is supplied from the comparison circuit 1432 to the discharge circuit 1433. Vo=VH indicates that the voltage Vm is large (that is, the accumulated charge amount is large). Therefore, in a case where Vo=VH, the discharge circuit 1433 discharges the accumulated charges.

Hereinafter, a current (discharge current) for causing the discharge circuit 1433 to perform discharging is represented as Idis. In a case where the following expression (1) is satisfied, the accumulated charges are gradually discharged by the discharge circuit 1433.

$$I\text{dis} > I\text{in} \tag{1}$$

As a result, the voltage Vm gradually decreases. When Vm<1V, the value of the voltage Vo changes, and thus Vo=VL.

In addition, Vo=VL indicates that the voltage Vm is small (that is, the accumulated charge amount is small). In a case where Vo=VL, the discharge circuit 1433 does not perform discharging. That is, at a time when the voltage Vo changes from VH to VL, the discharge circuit 1433 ends discharging.

In FIG. 17 (and FIG. 2 to be described), it is noted that arrows illustrated corresponding to the currents Iin and Idis represent general directions of signals independent of polarity of the accumulated charges. The directions of the currents Iin and Idis are not limited to the directions of the arrows. The currents Iin and Idis may be toward directions opposite to the directions of the arrows.

In a case where the discharge circuit 1433 stops discharging, the accumulated charge amount increases again by the current Iin supplied from the light receiving unit 1402. For this reason, the value of the voltage Vm increases again, and eventually reaches 1V. When the voltage Vm reaches 1V, Vo=VH, and thus discharging by the discharge circuit 1433 is started again.

Figure 18:
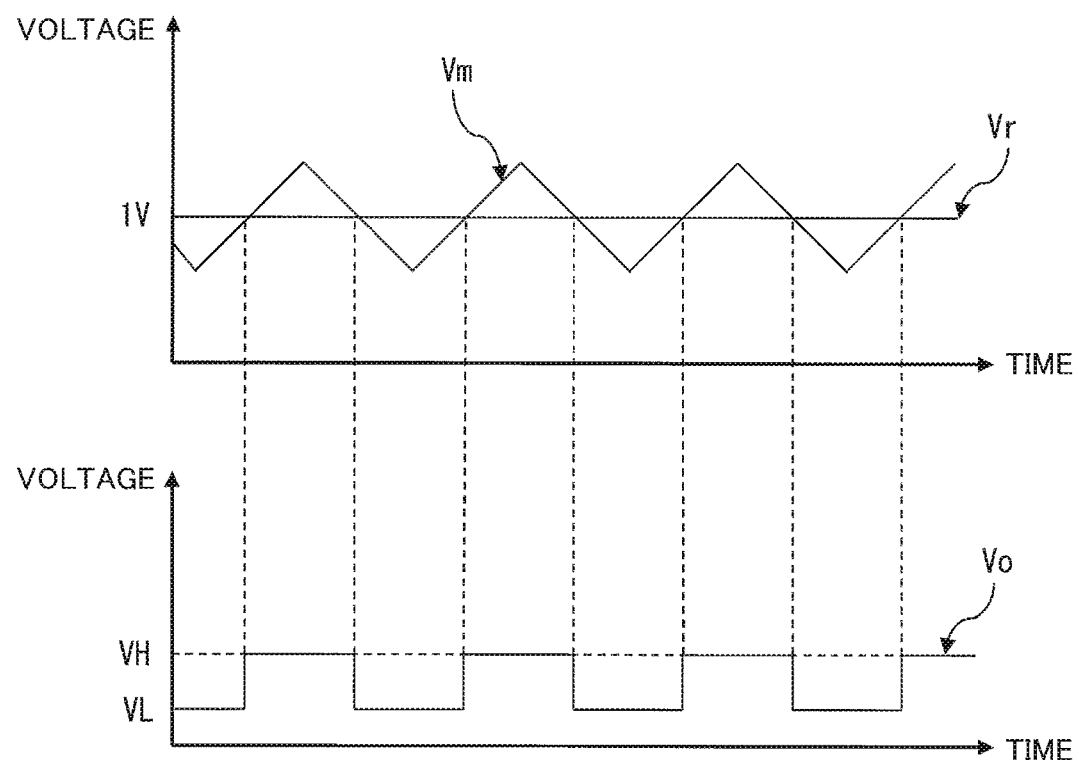
FIG. 18 is a diagram illustrating changes in voltages at the time of measurement by the AD conversion circuit of FIG. 17.

The integration circuit 1431, the comparison circuit 1432, and the discharge circuit 1433 repeat the above-described operations until measurement is completed. FIG. 18 is a graph illustrating waveforms of the voltages Vm, Vr, and Vo when measurement is performed. According to FIG. 18, it can be understood that the voltage Vm periodically increases and decreases by repetition of discharging. For this reason, the voltage Vo is switched alternately and periodically between a high level value and a low level value according to the increase or decrease of the voltage Vm.

In the graph of FIG. 18, even though Vo=VH, the voltage Vm continues to increase. This behavior is caused by response speeds of the integration circuit 1431 and the discharge circuit 1433.

The counter circuit 1434 monitors a level of the digital signal (that is, voltage Vo) (hereinafter, referred to as an input digital signal) input from the comparison circuit 1432 for each prescribed operation cycle. As an example, in a case where an operation frequency of the illuminance sensor 1007 is 2 MHz, an operation cycle of the counter circuit 1434 is 0.5 μs.

When the input digital signal is 1, the counter circuit 1434 increases (counts up) an output digital value (output digital signal) by 1. Thus, the output digital value, which is output from the counter circuit 1434 when measurement is completed, has a correlation relationship with the illuminance of the light L. For this reason, the output digital value can be used as an index representing the illuminance of the light L.

In order to obtain an N-bit output digital value, it is necessary to repeat counting processing in the counter circuit 1434 $2^N$ times. Therefore, when the operation frequency of the illuminance sensor 1007 is represented as f, a measurement time T of the illuminance sensor 1007 (a time required to detect the illuminance of the light L) is represented by the following expression (2).

$$T=(1/f) \times 2^N \quad (2)$$

As an example, a case where N=16 at f=2 MHz (that is, a case where the illuminance is represented by a 16-bit output digital value) is considered. In this case, according to expression (2), T=32.768 ms. Here, the reciprocal of the measurement time T is defined as a measurement frequency fT. In this case, fT≈30 Hz.

On the other hand, as described above, when a frequency of the power source is 50 Hz or 60 Hz, a flicker frequency is 100 Hz or 120 Hz. That is, the flicker frequency is approximately three to four times the measurement frequency fT of the illuminance sensor 1007.

That is, the illuminance sensor 1007 integrates light emission cycles of the light source over approximately three to four cycles during one illuminance measurement. For this reason, the output digital value is an index representing average illuminance (illuminance at which an influence of a flicker is reduced) close to the illuminance recognized by human eyes. The output digital value which is output from the counter circuit 1434 is output to the storage device 1404. The output digital value may be used for processing by the control circuit 1401.

In general, it is desirable that the illuminance sensor outputs a value having a high correlation with the illuminance recognized by human eyes as an output value indicating a measurement result. This is because a flicker is not normally recognized by human eyes as described above. For this reason, the measurement result of the illuminance influenced by a flicker causes a decrease in measurement accuracy of the illuminance (including a measurement error). Therefore, as described above, it is preferable to set the measurement time T at which an influence of a flicker can be reduced.

Here, it is examined whether a flicker can be detected by the illuminance sensor 1007 (illuminance sensor in the related art). As described above, the measurement time T is set to be long to some extent such that an output digital value in which an influence of a flicker is reduced can be obtained. In consideration of this point, when the measurement time T is set to be short, a flicker can be detected.

As an example, a case where N=10 at f=2 MHz (that is, a case where the illuminance is represented by a 10-bit output digital value) is considered. In this case, according to expression (2), T=0.512 ms. Therefore, fT≈2 kHz.

As described above, when a frequency of the power source is 50 Hz or 60 Hz, a flicker frequency is 100 Hz or 120 Hz. Therefore, the measurement frequency fT of the illuminance sensor 1007 in this case is 16 times or more the flicker frequency.

That is, the measurement time T can be sufficiently shortened compared to the flicker cycle (to be equal to or shorter than 1/16 of the flicker cycle). For this reason, when T=0.512 ms is set, the presence or absence of a flicker can be detected by reading the output digital value for each measurement time T and analyzing the output digital value. In addition, the flicker frequency can be detected.

(Room for Improvement in Related Art)

As described above, the image sensor 1101 of the smartphone 1000 (electronic device) has a function of detecting a flicker (flicker detection function), and thus it is possible to detect a flicker without increasing the number of components of the smartphone 1000.

However, in general, the power consumption of the image sensor 1101 is large. As an example, a case where the image sensor 1101 is configured with a complementary metal oxide semiconductor (CMOS) image sensor including 12 million pixels is considered. In this case, the power consumption of the image sensor 1101 is several hundred mW.

For this reason, in a case where the image sensor 1101 is frequently used, the remaining amount of a battery (charge amount) of the smartphone 1000 decreases. As a result, a use time of the smartphone 1000 is shortened. For this reason, from a viewpoint of reducing the power consumption of the smartphone 1000, it is preferable to shorten an operation time of the image sensor 1101 as much as possible and to simplify functions of the image sensor 1101.

Further, in a case where the illuminance sensor 1007 (illuminance sensor in the related art) has a flicker detection function, the following problems occur.

In general, the illuminance sensor 1007 communicates with other members based on a communication interface standard called inter-integrated circuit ($I^2C$). A communication signal in $I^2C$ includes an input/output signal SDA and a clock signal SCL.

On the other hand, the communication signal is asynchronous with respect to the measurement (operation) of the illuminance sensor. This is because it is necessary to independently operate the illuminance sensor 1007 (i) in a case where each member of the smartphone 1000 does not communicate with the illuminance sensor 1007, or (ii) in a case where each member of the smartphone 1000 is communicating with a sensor or a device other than the illuminance sensor 1007.

For this reason, even though the smartphone 1000 reads the measurement result (output digital value) of the illuminance sensor 1007 at the same time interval, the measurement result may not be properly read. For example, the same measurement value may be read twice, or one measurement value may be skipped and a next measurement value may be read. As a result, the measurement results are not properly read, and this causes a decrease in accuracy of flicker detection.

Further, in the illuminance sensor 1007, only one counter circuit 1434 and one storage device 1404 are provided. Thus, the illuminance sensor 1007 cannot simultaneously perform (i) detection of illuminance (illuminance recognized by human eyes) at which an influence of a flicker is reduced and (ii) detection of a flicker. For this reason, the illuminance sensor 1007 needs to perform measurement by switching the operation between a mode (illuminance detection mode) for detecting illuminance at which an influence of a flicker is reduced and a mode (flicker detection mode) for detecting a flicker.

As described above, there is still room for improvement in the technique for detecting a flicker in the related art. A configuration of an illuminance sensor 1 according to an embodiment 1 to be described has been derived in view of the above problems.

Embodiment 1

Hereinafter, an embodiment 1 will be described in detail with reference to FIGS. 1 to 5. For convenience of explanation, description of members having the same functions as the members described in the reference embodiment will be omitted as appropriate.

(Illuminance Sensor 1)

Figure 1:
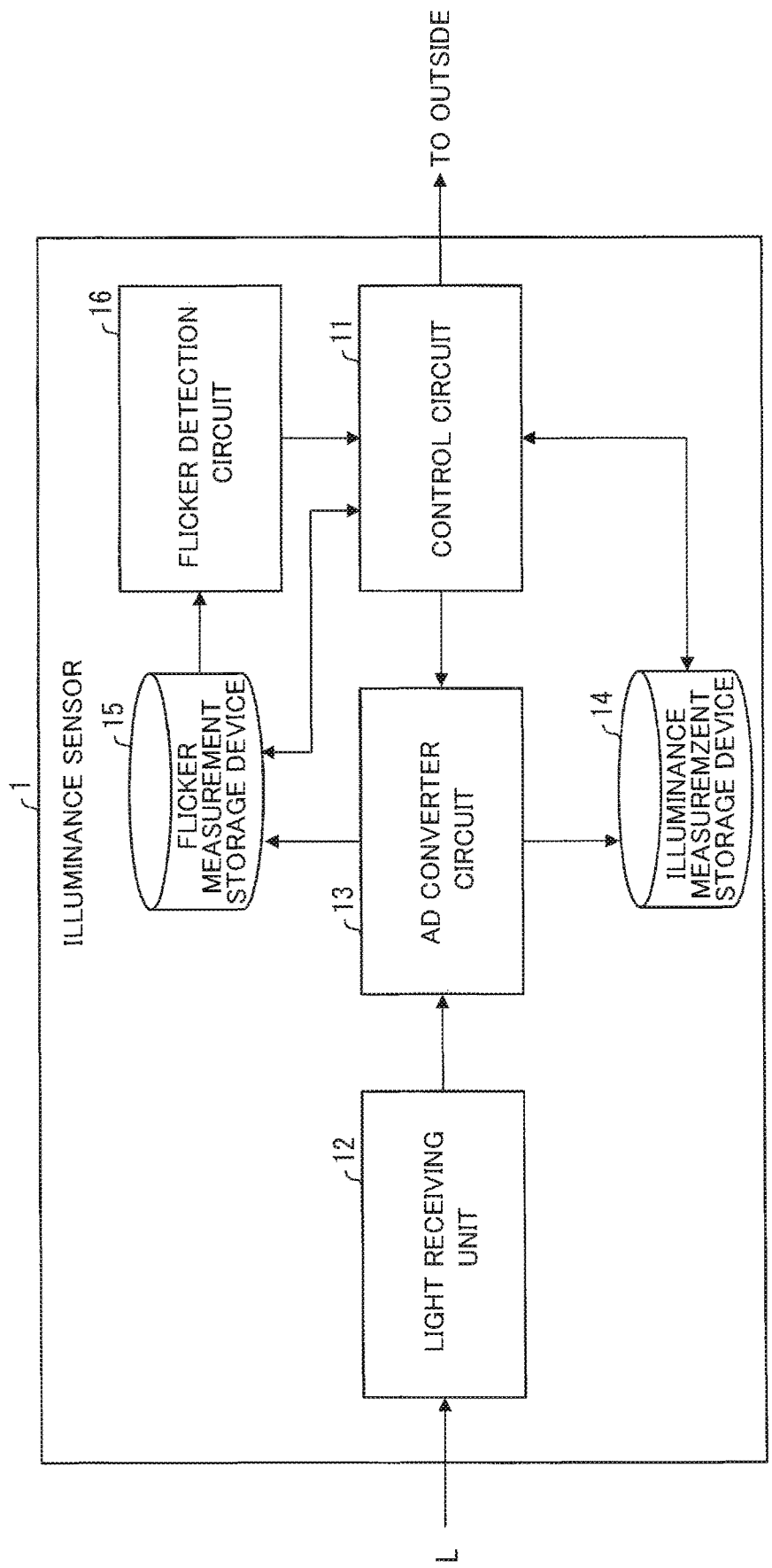
FIG. 1 is a functional block diagram illustrating a configuration of a main part of an illuminance sensor according to an embodiment 1.

FIG. 1 is a functional block diagram illustrating a configuration of a main part of an illuminance sensor 1 according to the embodiment 1. The illuminance sensor 1 includes a control circuit 11 (control unit), a light receiving unit 12, an AD conversion circuit 13 (AD conversion unit), an illuminance measurement storage device 14 (second storage unit), and a flicker measurement storage device 15 (first storage unit), and a flicker detection circuit 16 (flicker detection unit).

The illuminance sensor 1 is different from the illuminance sensor 1007 in that two storage devices (the illuminance measurement storage device 14 and the flicker measurement storage device 15) and the flicker detection circuit 16 are included. Further, as will be described later, a configuration of the AD conversion circuit 13 is also different from that of the AD conversion circuit 1403.

The control circuit 11 overall controls each unit of the illuminance sensor 1. The illuminance measurement storage device 14 and the flicker measurement storage device 15 store data used for processing of the control circuit 11 and the flicker detection circuit 16. The illuminance measurement storage device 14 and the flicker measurement storage device 15 may be nonvolatile storage devices or volatile storage devices. As an example, a volatile semiconductor memory device such as a static RAM (SRAM) or a dynamic RAM (DRAM) is used as the volatile storage device.

The light receiving unit 12 is configured with a photoelectric conversion element (light receiving element) such as a photodiode, similarly to the light receiving unit 1402 described above. In the embodiment 1, a current (photocurrent) supplied from the light receiving unit 12 to the AD conversion circuit 13 is represented as a current Iin. The light receiving unit 12 receives the light L and supplies the current Iin to the AD conversion circuit 13.

Preferably, the light receiving unit 12 is configured with a plurality of light receiving elements having spectral sensitivity characteristics different from each other.

(AD Conversion Circuit 13)

Figure 2:
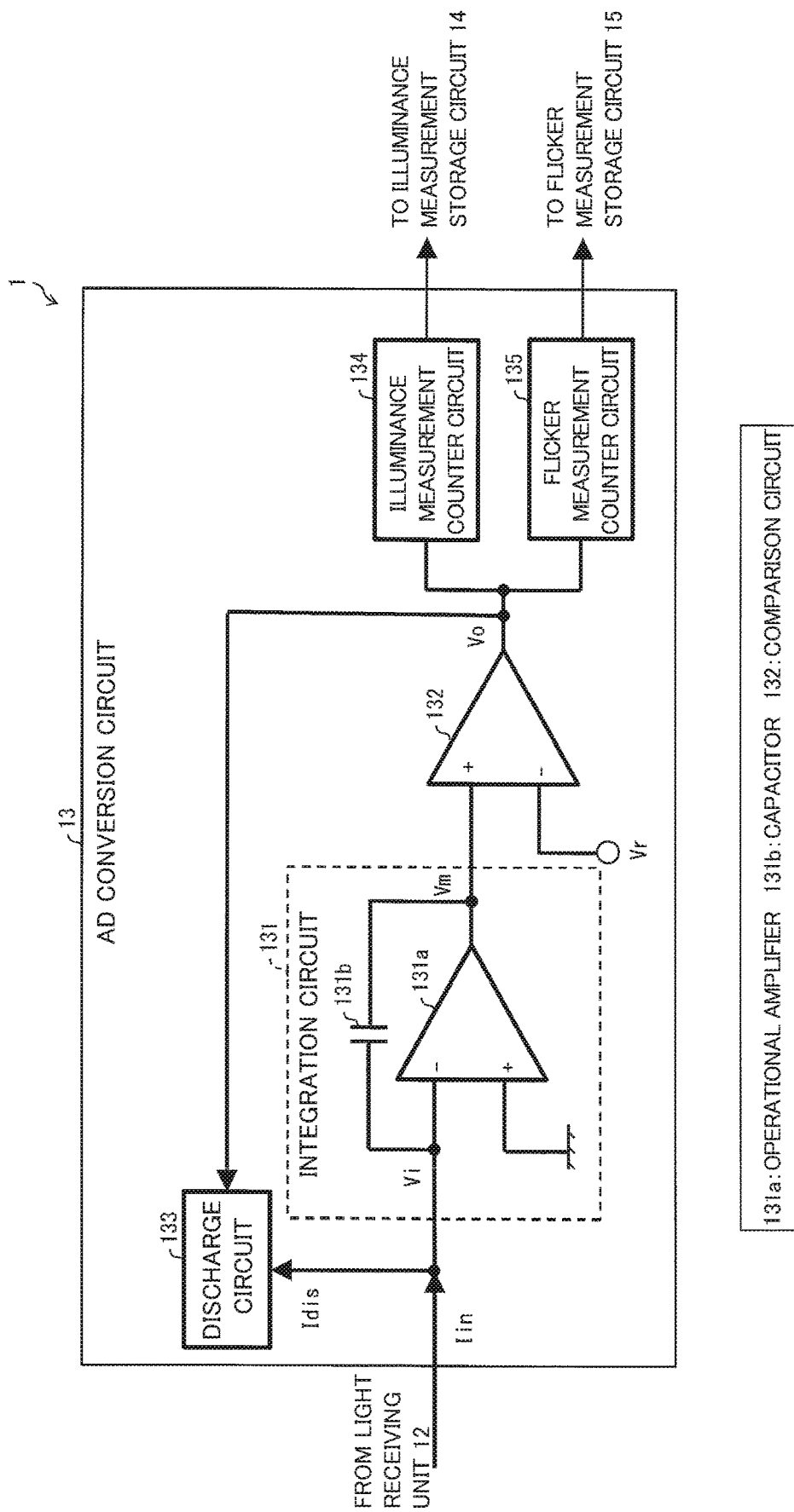
FIG. 2 is a circuit diagram illustrating a configuration of an AD conversion circuit of the illuminance sensor of FIG. 1.

FIG. 2 is a circuit diagram illustrating a configuration of the AD conversion circuit 13. The AD conversion circuit 13 includes an integration circuit 131, a comparison circuit 132, a discharge circuit 133, an illuminance measurement counter circuit 134 (second counter), and a flicker measurement counter circuit 135 (first counter). Further, the integration circuit 131 includes an operational amplifier 131a and a capacitor 131b.

The AD conversion circuit 13 is different from the AD conversion circuit 1403 in that two counter circuits (the illuminance measurement counter circuit 134 and the flicker measurement counter circuit 135 are included). The AD conversion circuit 13 performs AD conversion of the current Iin, and outputs a flicker measurement output digital value (first digital signal) and an illuminance measurement output digital value (second digital signal), which are described below.

Functions of the integration circuit 131, the comparison circuit 132, and the discharge circuit 133 are the same as those of the integration circuit 1431, the comparison circuit 1432, and the discharge circuit 1433 described above. The voltages Vm, Vr, and Vo are the same as in the reference embodiment.

In the AD conversion circuit 13, an output terminal of the comparison circuit 132 is connected to (i) the discharge circuit 133 and (ii) the illuminance measurement counter circuit 134 and the flicker measurement counter circuit 135.

In the AD conversion circuit 13, waveforms of the voltages Vm, Vr, and Vo are the same as those in FIG. 18. That is, even in the AD conversion circuit 13, the voltage Vm periodically increases and decreases by repetition of discharging. Thus, the voltage Vo is switched alternately and periodically between a high level value (VH) and a low level value (VL) according to the increase or decrease of the voltage Vm.

In a case where the illuminance of the light L is very low, the current Iin (current for charging the capacitor 131b) becomes very small. Thus, the following expression (3) is satisfied.

$$Idis \gg Iin \qquad (3)$$

That is, the current Iin is sufficiently smaller than the current Idis (discharge current of the discharge circuit 133).

On the other hand, in a case where the illuminance of the light L is very high, the current Iin becomes very large. Thus, the following expression (4) is satisfied.

$$Idis \ll Iin \qquad (4)$$

That is, the current Iin is sufficiently larger than the current Idis. In this way, in a case where the illuminance of the light L is very low or very high, the current Iin greatly deviates from the current Idis.

In a case where expression (3) is satisfied, the voltage Vm becomes a low level value (digital value 0) during most of the measurement time, and thus an accurate measurement result cannot be obtained. On the other hand, in a case where expression (4) is satisfied, the voltage Vm becomes a high level value (digital value 1) during most of the measurement time. Even in this case, an accurate measurement result cannot be obtained.

Therefore, preferably, the discharge circuit 133 is configured so as to be able to change a value of the current Idis. By setting the current Idis so as not to greatly deviate from the current Iin, it is possible to prevent a decrease in measurement accuracy. For example, preferably, the discharge circuit 133 sets the current Idis based on the current Iin.

Similarly to the counter circuit 1434, each of the illuminance measurement counter circuit 134 and the flicker measurement counter circuit 135 monitors a level of the input digital signal (voltage Vo), which is input from the comparison circuit 132, for each prescribed operation cycle.

Similarly to the counter circuit 1434, each of the illuminance measurement counter circuit 134 and the flicker measurement counter circuit 135 increases (counts up) the output digital value by 1 when the input digital signal is 1.

Hereinafter, in order to distinguish the output digital values, the output digital value of the illuminance measurement counter circuit 134 is referred to as an illuminance measurement output digital value (second digital signal). Further, the output digital value of the flicker measurement counter circuit 135 is referred to as a flicker measurement output digital value (first digital signal).

The illuminance measurement counter circuit 134 outputs the illuminance measurement output digital value as an index of the illuminance of the light L, by the same processing as processing of the counter circuit 1434. As described above, a case where the operation frequency f of the illuminance sensor 1 is 2 MHz is considered. Further, it is assumed that the number of bits of the illuminance measurement output digital value is N1. Hereinafter, a case of N1=16 is described.

Hereinafter, the measurement time of the illuminance measurement counter circuit 134 is represented as an illuminance measurement time T1. According to expression (2), the illuminance measurement time T1 is T1=32.768 ms. The illuminance measurement time T1 is a cycle during which the illuminance measurement output digital value (second digital signal) is output from the illuminance measurement counter circuit 134. The reciprocal of the illuminance measurement time T1 is defined as an illuminance measurement frequency fT1. fT1≈30 Hz.

In this way, in the illuminance sensor 1, the illuminance measurement frequency fT1 is set to be approximately ⅓ to ¼ times the flicker frequency (100 Hz or 120 Hz). As described above, by providing the illuminance measurement counter circuit 134, it is possible to properly detect the illuminance (illuminance recognized by human eyes) at which an influence of a flicker is reduced. The illuminance measurement counter circuit 134 outputs the illuminance measurement output digital value to the illuminance measurement storage device 14.

The flicker measurement counter circuit 135 outputs the flicker measurement output digital value as an index of the flicker of the light L. As described above, it is necessary to set a flicker measurement time (hereinafter, flicker measurement time T2) of the flicker measurement counter circuit 135 to be sufficiently shorter than the illuminance measurement time T1. The flicker measurement time T2 is a cycle during which the flicker measurement output digital value (first digital signal) is output from the flicker measurement counter circuit 135.

In a case where the flicker measurement time T2 is too long, a sampling interval becomes long, and thus calculation accuracy of the flicker frequency is decreased. On the other hand, in a case where the flicker measurement time T2 is too short, the number of samples increases, while a change in value for each sample becomes small. As a result, even in this case, calculation accuracy of the flicker frequency is decreased.

Therefore, it is necessary to properly set the flicker measurement time T2 such that calculation accuracy of the flicker frequency can be maintained. In the embodiment 1, as an example, a case where the flicker measurement time T2 is set to approximately 0.5 ms and the flicker measurement counter circuit 135 is operated is considered.

Here, when expression (2) is transformed, the following expression (5) is obtained.

$$2^N = T \times f \quad (5)$$

According to expression (5), the number of bits N of the flicker measurement output digital value can be set according to the operation frequency f of the illuminance sensor 1 and the flicker measurement time T2. Hereinafter, the number of bits of the flicker measurement output digital value is represented as N2.

In a case where f=2 MHz and T2=0.5 ms, when N2=10, the left side and the right side of expression (5) are approximately equal. Thus, N2 may be set to 10 bits. Therefore, the flicker measurement counter circuit 135 repeats counting processing of the output digital value $2^{10}$ times. As described above, in order to make the flicker measurement time T2 shorter than the illuminance measurement time T1, the number N2 of bits of the flicker measurement output digital signal may be set to be smaller than the number N1 of bits of the illuminance measurement output digital signal (for example, N1=16).

The flicker measurement counter circuit 135 outputs the count-up result to the flicker measurement storage device 15, as the flicker measurement output digital value. When the flicker measurement output digital value is output to the flicker measurement storage device 15, the flicker measurement counter circuit 135 is initialized. That is, the flicker measurement output digital value is returned to zero. The same processing is repeated until the illuminance measurement time T1 is reached.

As described above, the flicker is a phenomenon that changes faster (has a higher frequency) than a change in illuminance recognized by human eyes. When the flicker measurement time T2 is shorter than the illuminance measurement time T1, the flicker measurement output digital value becomes data including a higher frequency than the frequency of the illuminance measurement output digital value. Thus, the flicker measurement output digital value can be properly used as an index of the flicker.

When the illuminance measurement time T1 is reached, the illuminance measurement counter circuit 134 is initialized. That is, the illuminance measurement output digital value is returned to zero. As described above, the flicker measurement counter circuit 135 is initialized in a shorter cycle (time) than the cycle of the illuminance measurement counter circuit 134. In other words, the flicker measurement counter circuit 135 is initialized faster than the illuminance measurement counter circuit 134 is. Thereby, it is possible to more reliably detect the flicker in one illuminance measurement.

The number S of pieces of the flicker measurement sample data obtained in one illuminance measurement is represented by the following expression (6).

$$S = 2^{(N1-N2)} \quad (6)$$

In a case where N1=16 and N2=10, $S=2^6=64$. This means that (i) approximately 20 pieces of flicker measurement sample data per cycle are obtained for the flicker with a frequency of 100 Hz, and that (ii) approximately 17 pieces of flicker measurement sample data per cycle are obtained for the flicker with a frequency of 120 Hz.

Figure 3:
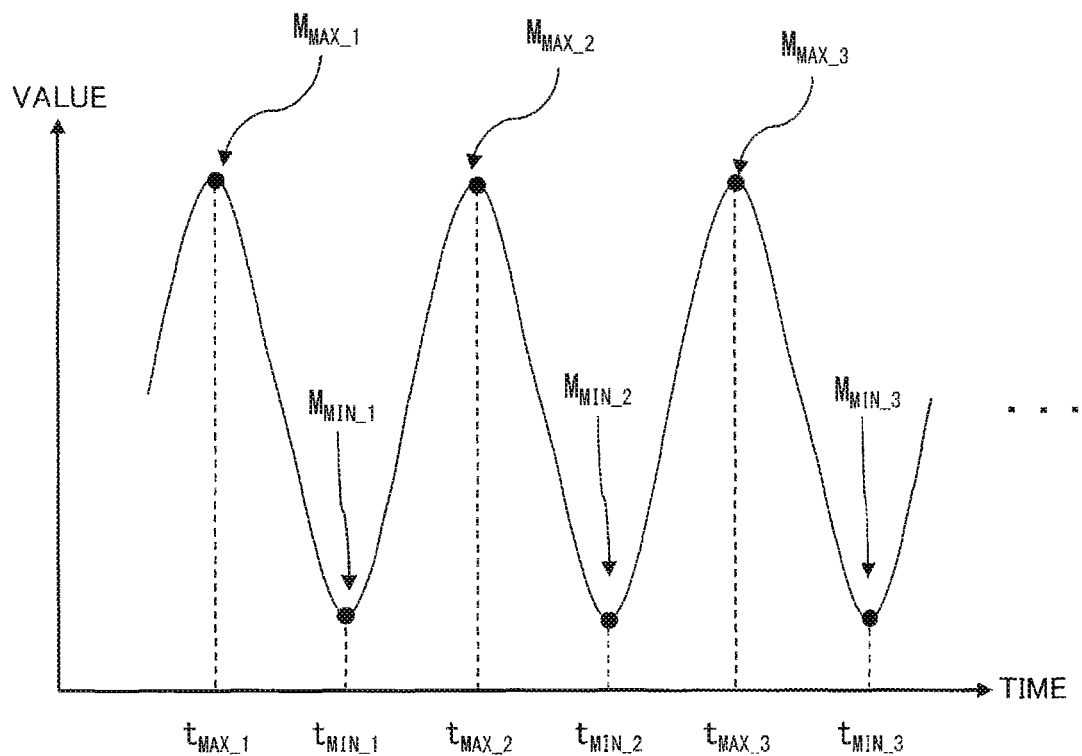
FIG. 3 is a diagram illustrating a waveform of sample data obtained in the illuminance sensor of FIG. 1.

In a case where a flicker occurs, when the flicker measurement output digital value stored in the flicker measurement storage device 15 is plotted in a time series, a graph illustrated in FIG. 3 is obtained. FIG. 3 is a graph illustrating a waveform of sample data obtained in the illuminance sensor 1. A result obtained by counting-up the flicker measurement output digital value until the illuminance measurement time T1 is reached matches with the illuminance measurement output digital value.

The flicker measurement storage device 15 needs to have a storage area for storing 64 pieces (S pieces) of 10-bit (N2-bit) data. That is, the flicker measurement storage device 15 needs to have a relatively-large storage area of 10×64=640 bits. Thus, from a viewpoint of storage area efficiency, preferably, the flicker measurement storage device 15 is configured with a volatile memory (volatile semiconductor memory device) such as an SRAM rather than a register (register group).

(Flow of Flicker Detection Processing in Flicker Detection Circuit 16)

Figure 4:
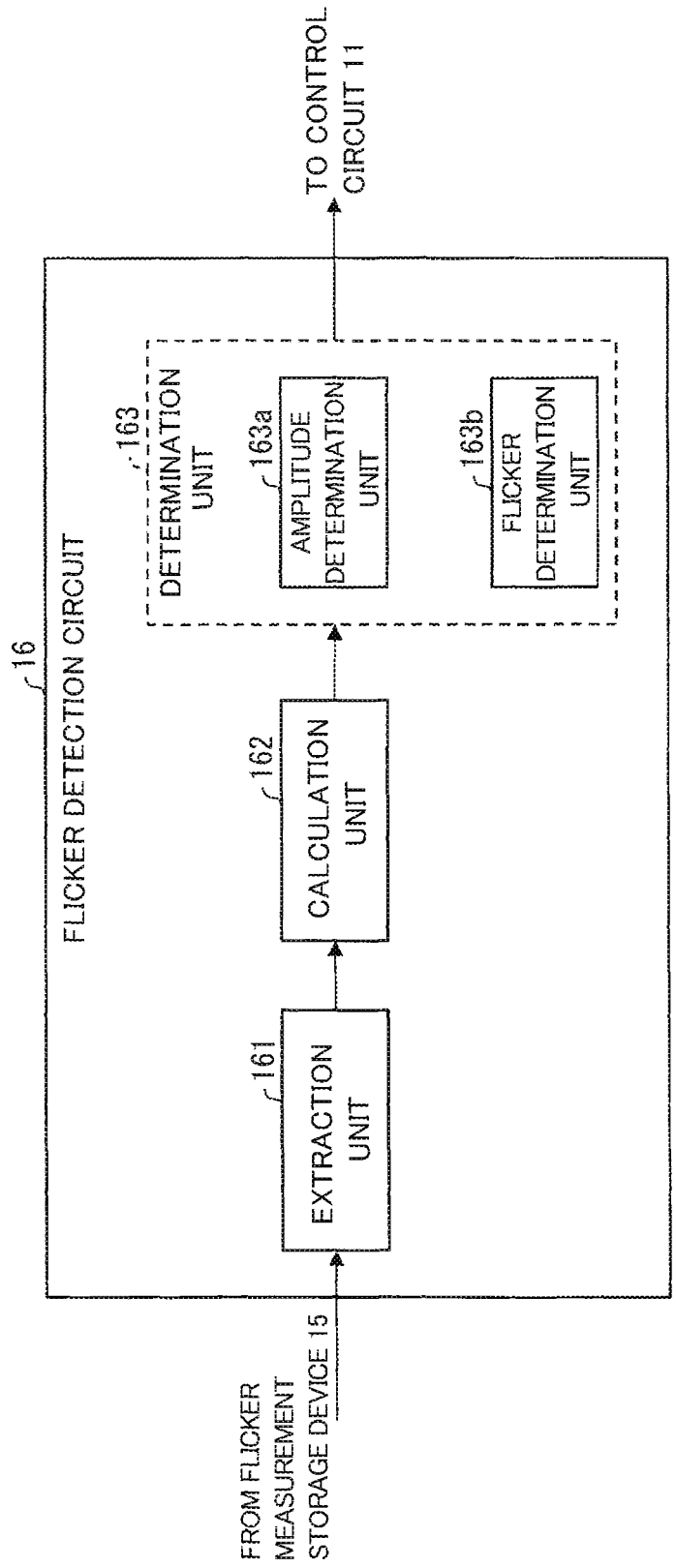
FIG. 4 is a functional block diagram illustrating a configuration of a main part of a flicker detection circuit of the illuminance sensor of FIG. 1.

FIG. 4 is a functional block diagram illustrating a configuration of a main part of the flicker detection circuit 16. The flicker detection circuit 16 includes an extraction unit 161, a calculation unit 162, and a determination unit 163. Further, the determination unit 163 includes an amplitude determination unit 163a and a flicker determination unit 163b.

The flicker detection circuit 16 reads the sample data (refer to FIG. 3) stored in the flicker measurement storage device 15, and analyzes the sample data. The flicker detection circuit 16 determines the presence or absence of a flicker (whether or not a flicker occurs) based on the analysis result of the sample data. Further, in a case where a flicker occurs, the flicker detection circuit 16 determines a flicker frequency.

Figure 5:
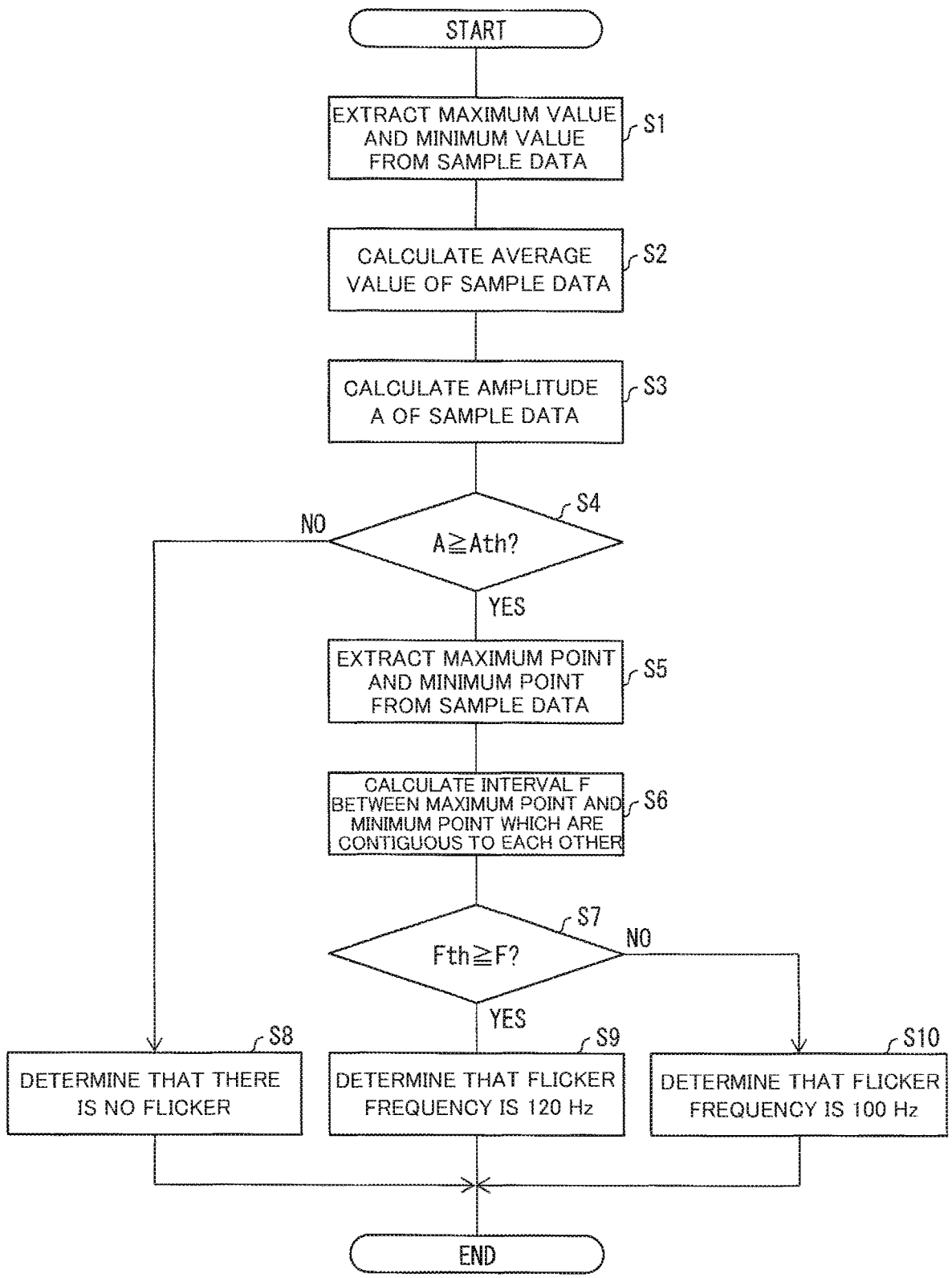
FIG. 5 is a diagram illustrating a flow of processing of detecting a flicker in the illuminance sensor of FIG. 1.

The extraction unit 161 extracts prescribed sample data from the flicker measurement storage device 15. The calculation unit 162 performs a prescribed calculation on the sample data. The determination unit 163 determines the presence or absence of a flicker based on the calculation result of the calculation unit 162. Hereinafter, an operation of each unit of the flicker detection circuit 16 will be described with reference to FIG. 5. FIG. 5 is a flowchart illustrating a flow of the flicker detection processing S1 to S10 in the flicker detection circuit 16.

Examples of a sample data analysis method for determining a flicker include Fourier transform, correlation comparison with known flicker patterns, and time measurement between a local maximum point and a local minimum point of sample data. Hereinafter, a case of determining a flicker by measuring a time between a local maximum point and a local minimum point of sample data will be described.

First, the extraction unit 161 extracts a global maximum value and a global minimum value of the sample data from the sample data stored in the flicker measurement storage device 15 (S1). Hereinafter, the global maximum value of the sample data is represented as MM, and the global minimum value of the sample data is represented as ML. The calculation unit 162 outputs an average value of the sample data stored in the flicker measurement storage device 15 (S2). Hereinafter, the average value of the sample data is represented as Mm.

The calculation unit 162 calculates an amplitude A of the sample data by subtracting the global minimum value ML of the sample data from the global maximum value MM of the sample data (S3). That is, the calculation unit 162 calculates the amplitude A, as A=MM−ML (as a difference between the global maximum value MM and the global minimum value ML).

In the determination unit 163, the amplitude determination unit 163a determines the presence or absence of a flicker using the amplitude A. Specifically, the amplitude determination unit 163a determines whether or not the amplitude A is equal to or larger than a prescribed amplitude threshold value Ath (an amplitude reference value) (that is, whether or not A≥Ath) (S4). The amplitude threshold value Ath may be referred to as a first threshold value.

The amplitude threshold value Ath may be arbitrarily set as long as the presence or absence of a flicker can be properly determined. As an example, the amplitude threshold value Ath may be set by the amplitude determination unit 163a. In the embodiment 1, a case where Ath=0.1×Mm is set by the amplitude determination unit 163a is considered. That is, a case where the amplitude threshold value Ath is set to a value of 10% (0.1 times) of the average value Mm is considered. Therefore, it is possible to improve accuracy of flicker detection by setting the amplitude threshold value Ath according to the average value Mm.

On the other hand, the amplitude threshold value Ath may be set to a value that does not depend on the average value Mm (for example, a fixed value). In a case where the amplitude threshold value Ath is set to a value that does not depend on the average value Mm, the processing of S2 may be omitted.

In a case of A<Ath (NO in S4), the amplitude determination unit 163a determines that a flicker does not occur (S8). Then, the flicker detection processing in the flicker detection circuit 16 is ended.

On the other hand, in a case of A≥Ath (YES in S4), the amplitude determination unit 163a determines that a flicker occurs. In this case, the extraction unit 161 extracts a local maximum point (local maximum value) and a local minimum point (local minimum value) of the sample data from the sample data stored in the flicker measurement storage device 15 (S5).

As illustrated in FIG. 3, sample data of which the value periodically changes is considered. In FIG. 3, $M_{MAX\_1}$, $M_{MAX\_2}$, and $M_{MAX\_3}$ are examples of local maximum points (points at which local maximum values are obtained) of the sample data. Here, a local maximum point of an i-th ordered cycle (i-th cycle) is represented as a local maximum point $M_{MAX\_i}$. For example, the local maximum point $M_{MAX\_1}$ is a local maximum point of a first cycle. The local maximum point $M_{MAX\_i}$ is a point indicating a local maximum value of the sample data in the i-th cycle. The local maximum $M_{MAX\_i}$ may be understood as the i-th local maximum of the sample data.

Further, in FIG. 3, $M_{MIN\_1}$, $M_{MIN\_2}$, and $M_{MIN\_3}$ are examples of local minimum points (points at which local minimum values are obtained) of the sample data. Here, a local minimum of an i-th cycle is represented as a local minimum point $M_{MIN\_i}$. For example, the local minimum point $M_{MIN\_1}$ is a local minimum point of a first cycle. The local minimum point $M_{MIN\_i}$ is a point indicating a local minimum value of the sample data in the i-th cycle. The local minimum point $M_{MIN\_i}$ may be understood as the i-th local minimum point of the sample data.

Various methods may be used for extracting a local maximum point and a local minimum point in the extraction unit 161. For example, the extraction unit 161 may extract a local maximum point and a local minimum point by calculating a difference Δ between a P-th sample data (predetermined sample data) and a P−1-th sample data (previous sample data).

In the P-th sample data, in a case where a sign of the difference Δ changes from positive to negative, the extraction unit 161 may extract the P-th sample data as a local maximum point. Further, in a case where the sign of the difference Δ changes from negative to positive, the extraction unit 161 may extract the P-th sample data as a local minimum point.

Here, in the sample data, a time corresponding to the local maximum point $M_{MAX\_i}$ (a time at which the i-th global maximum point exists) is represented as a time $t_{MAX\_i}$. Further, a time corresponding to the local minimum point $M_{MIN\_i}$ (a time at which the i-th local minimum point exists) is represented as a time $t_{MIN\_i}$.

In the determination unit 163, the flicker determination unit 163b calculates a time interval between the i-th local maximum point $M_{MAX\_i}$ and the i-th local minimum point $M_{MIN\_i}$ (that is, $F=|t_{MAX\_i}-t_{MIN\_i}|$), and specifies a flicker frequency (S6).

When the time interval F is small (that is, when the time interval is narrow), it is considered that the flicker frequency is high. On the other hand, when the time interval F is large (that is, when the time interval is wide), it is considered that the flicker frequency is low.

Therefore, the flicker determination unit 163b determines the flicker frequency by determining whether or not the following expression (7) is satisfied (S7).

$$Fth \geq F = |t_{MAX\_i} - t_{MIN\_i}| \qquad (7)$$

Fth is a threshold value (reference value) of the time interval, and may be referred to as a time threshold value (second threshold value). By properly setting the time threshold value Fth, it is possible to determine whether the flicker frequency is a first flicker frequency or a second flicker frequency.

The first flicker frequency is a lower flicker frequency of two flicker frequencies which are assumed in advance. In addition, the second flicker frequency is a higher flicker frequency of the two flicker frequencies. In the embodiment 1, a case where the first flicker frequency is 100 Hz and the second flicker frequency is 120 Hz is described.

As an example, in a case where i satisfying Fth≥F exists (YES in S7), the flicker determination unit 163b determines that the flicker frequency is 120 Hz (second flicker frequency) (S9).

On the other hand, in a case where i satisfying Fth≥F does not exist (that is, for all i, Fth<F) (NO in S7), the flicker determination unit 163b determines that the flicker frequency is 100 Hz (first flicker frequency) (S8). When determination of the flicker frequency is completed, the flicker detection processing in the flicker detection circuit 16 is completed.

As an example, the threshold value Fth for distinguishing the flicker frequency of 100 Hz and the flicker frequency of 120 Hz can be set as follows.

As described above, in a case where f=2 MHz and N2=10, the flicker measurement time T2 (sampling cycle for flicker measurement) is approximately 0.5 ms. Thus, approximately 20 pieces of sample data exist in a flicker cycle of 10 ms (flicker frequency of 100 Hz). Further, approximately 16 pieces of sample data exist in a flicker cycle of 8.3 ms (flicker frequency of 120 Hz).

Here, the interval between the local maximum point and the local minimum point which are contiguous to each other in the sample data is ½ of the flicker cycle. Thus, at the flicker frequency of 100 Hz, approximately 10 pieces of sample data exist in the interval. On the other hand, at the flicker frequency of 120 Hz, approximately 8 pieces of sample data exist in the interval.

Therefore, when Fth is set to a time corresponding to 9 pieces of sample data (that is, when Fth=9×T2=4.5 ms), the flicker frequency of 100 Hz and the flicker frequency of 120 Hz can be distinguished by expression (7).

In the example, a method of specifying the flicker frequency using pieces of sample data extracted between the local maximum point and the local minimum point in one cycle is described. On the other hand, in order to further improve determination accuracy, pieces of sample data may be extracted in a plurality of cycles.

For example, when pieces of sample data are extracted between the local maximum point $M_{MAX\_1}$ and the local maximum point $M_{MAX\_3}$ in FIG. 3, flicker cycles for two cycles may be considered. Thus, 40 pieces of sample data can be extracted at the flicker frequency of 100 Hz. In addition, 40 pieces of sample data can be extracted at the flicker frequency of 100 Hz.

In this case, when Fth is set to a time corresponding to 36 pieces of sample data, the flicker frequency of 100 Hz and the flicker frequency of 120 Hz can be distinguished. By determining the flicker frequency using more pieces of sample data, it is possible to reduce erroneous determination caused by a variation in measurement.

The processing of S5 to S7 for specifying the flicker frequency is merely an example. The method for specifying the flicker frequency is not limited thereto, and another method may be used. For example, as described above, a method of specifying the flicker frequency by performing Fourier transform on the sample data may be used.

The flicker detection circuit 16 outputs flicker determination result information indicating a determination result by the flicker detection circuit 16 (for example, the presence or absence of a flicker, and the flicker frequency), to the control circuit 11. The control circuit 11 can further output the flicker determination result information, to the outside of the illuminance sensor 1 (for example, a processor connected to the illuminance sensor 1). That is, the control circuit 11 functions as an output unit that outputs the flicker determination result information.

Figure 8:
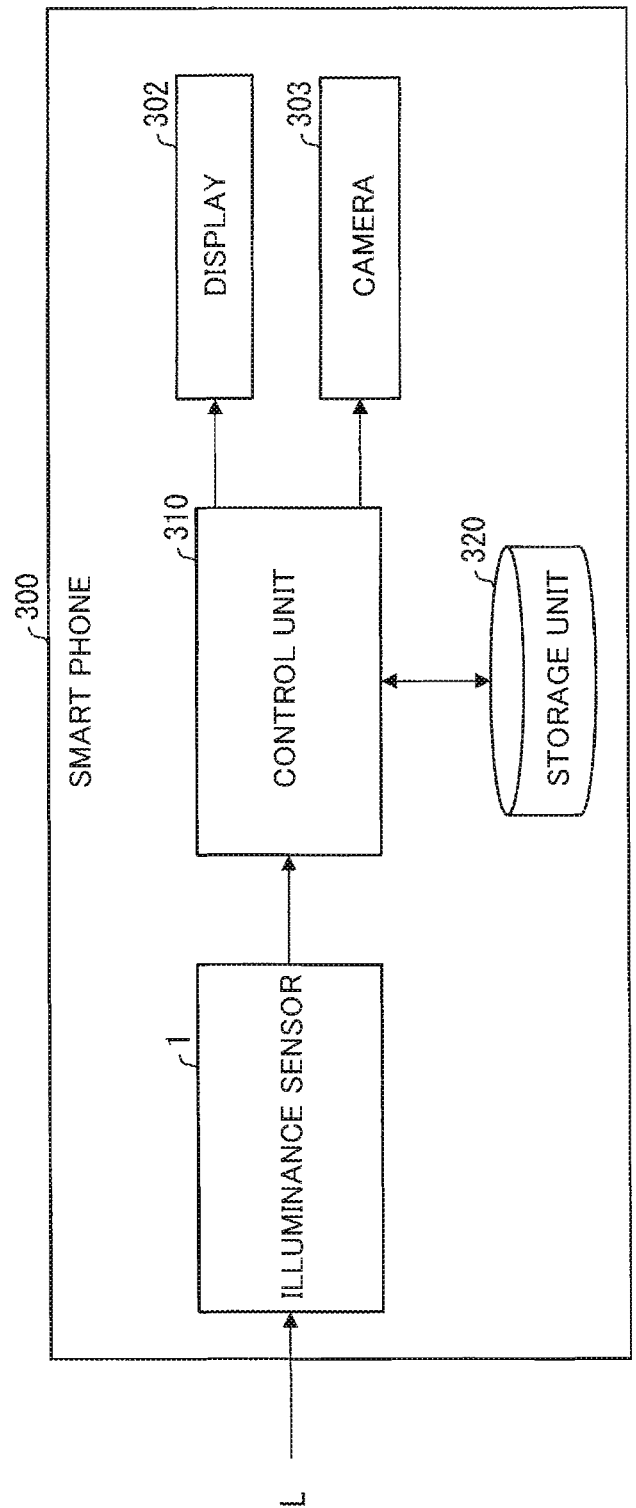
FIG. 8 is a functional block diagram illustrating a configuration of a main part of the smartphone of FIG. 8.

For example, the control circuit 11 can output the flicker determination result information, to a control unit 310 of a smartphone 300 (electronic device) to be described (refer to FIG. 8 to be described). Thus, in a case where the illuminance sensor 1 detects a flicker, a user of the smartphone 300 can change an exposure time of a camera 303 according to the flicker frequency detected by the illuminance sensor 1.

(Effect of Illuminance Sensor 1)

According to the illuminance sensor 1, two counter circuits (the illuminance measurement counter circuit 134 and the flicker measurement counter circuit 135) are provided, and thus it is possible to perform processing for detecting illuminance (illuminance detection processing) and processing for detecting a flicker (flicker detection processing) in parallel. Therefore, unlike the illuminance sensor in the related art (illuminance sensor 1007), it is not necessary to perform measurement while switching an operation between an illuminance detection mode and a flicker detection mode.

Further, the illuminance sensor 1 includes two storage devices (the illuminance measurement storage device 14 and the flicker measurement storage device 15). Therefore, in the illuminance sensor 1, the flicker detection circuit 16 can read the flicker measurement output digital value (first digital signal) from the flicker measurement storage device 15.

That is, compared to the illuminance sensor in the related art, it is possible to more reliably read the data for flicker detection. Therefore, a failure in reading can be reduced, and thus it is possible to detect a flicker with higher accuracy than in the related art.

Further, in a general illuminance sensor, the power consumption is several hundred μW. For this reason, the illuminance sensor 1 may also operate with power consumption of several hundred μW. On the other hand, as described above, the power consumption of the image sensor 1101 of the smartphone 1000 (PTL 1) in the reference embodiment is several hundred mW.

In this way, according to the illuminance sensor 1, compared to a case where the image sensor 1101 is used, the power consumption for flicker detection can be reduced to approximately 0.1%. Therefore, it is possible to reduce power consumption of the electronic device (for example, the smartphone 300) including the illuminance sensor 1.

Embodiment 2

An embodiment 2 will be described with reference to FIG. 6 as follows. For convenience of explanation, members having the same functions as the members described in the embodiment are denoted by the same reference numerals, and description of the members will be omitted.

Figure 6:
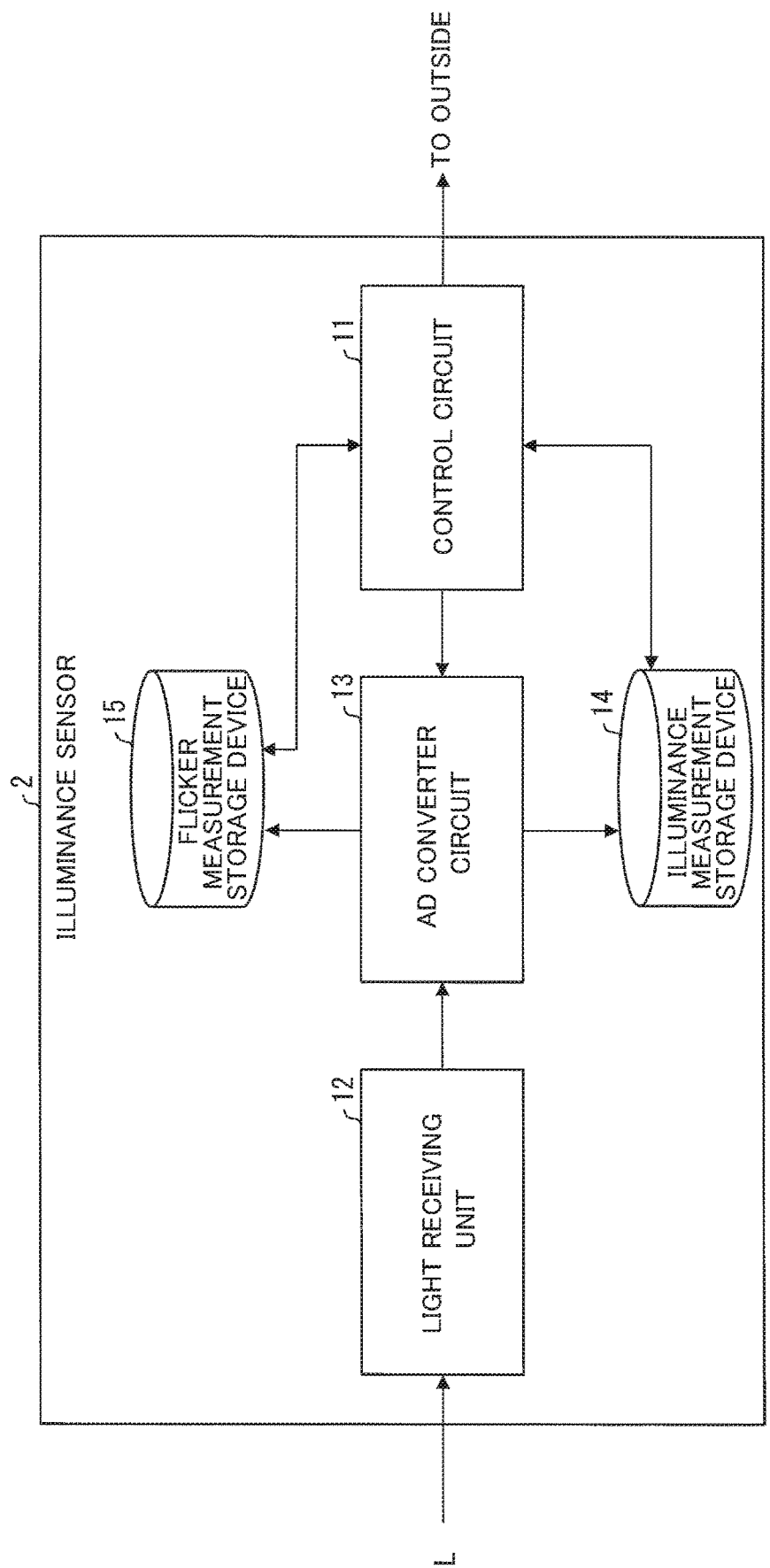
FIG. 6 is a functional block diagram illustrating a configuration of a main part of an illuminance sensor according to an embodiment 2.

FIG. 6 is a functional block diagram illustrating a configuration of a main part of an illuminance sensor 2 according to an embodiment 2. The illuminance sensor 2 has a configuration in which the flicker detection circuit 16 is removed from the illuminance sensor 1 according to the embodiment 1.

The illuminance sensor 2 measures illuminance by the same method as the method described in PTL 2, using the AD conversion circuit 13. As in the embodiment 1, the AD conversion circuit 13 stores the illuminance measurement output digital value in the illuminance measurement storage device 14. Further, the AD conversion circuit 13 stores sample data of the flicker measurement output digital value in the flicker measurement storage device 15.

In the illuminance sensor 2, the control circuit 11 (output unit) outputs the sample data stored in the flicker measurement storage device 15, to the outside of the illuminance sensor 2 (for example, the control unit 310 of the smartphone 300). The control unit 310 (a processor outside the illuminance sensor 2) processes the sample data, and thus a flicker can be detected. For example, the control unit 310 has the function of the flicker detection circuit 16, and thus a flicker can be detected by the function of the flicker detection circuit 16. In this way, in consideration of a system configuration of an electronic device (for example, the smartphone 300) including the illuminance sensor 2, it is possible to make a processor of the electronic device have a flicker detection function.

According to the illuminance sensor 2, the flicker detection circuit 16 can be removed, and thus the configuration can be simplified compared to the configuration of the illuminance sensor 1. In this way, the outside the illuminance sensor 2 has a flicker detection function, and thus the configuration of the illuminance sensor can be simplified.

Embodiment 3

Figure 7:
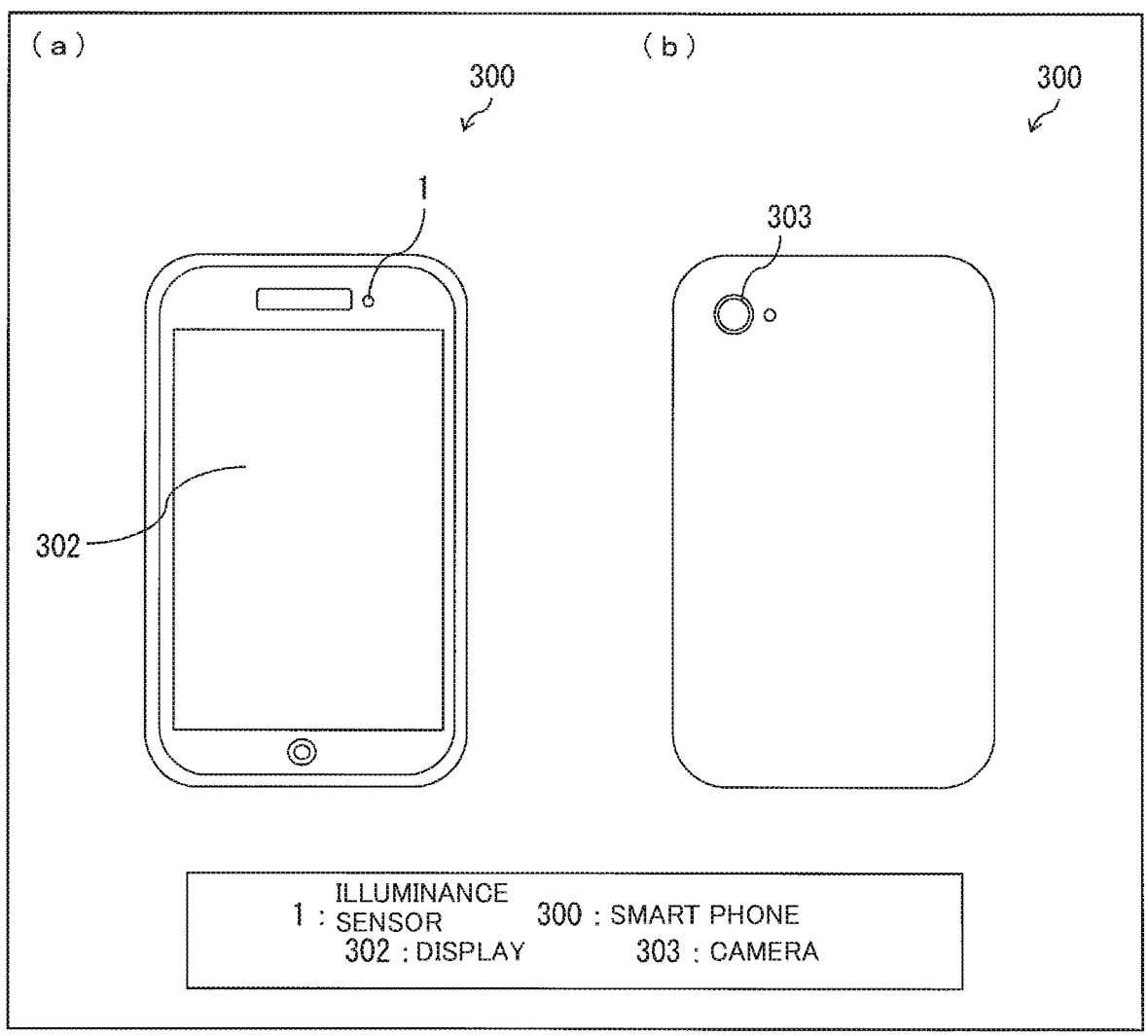
FIG. 7 is a view illustrating an appearance of a smartphone according to an embodiment 3, (a) is a front view, and (b) is a rear view.

An embodiment 3 will be described with reference to FIGS. 7 and 8 as follows. FIG. 7 is a diagram illustrating an appearance of the smartphone 300 according to an embodiment 3. In FIG. 7, (a) is a front view of the smartphone 300, and (b) is a rear view of the smartphone 300. FIG. 8 is a functional block diagram illustrating a configuration of a main part of the smartphone 300.

The smartphone 300 includes an illuminance sensor 1, a display 302, a camera 303, a control unit 310, and a storage unit 320. On the other hand, in the smartphone 300, the illuminance sensor 2 according to the embodiment 2 may be provided instead of the illuminance sensor 1 according to the embodiment 1.

The smartphone 300 further includes known other members (members similar to those of the smartphone 1000). The other members are not related to description of the embodiment 3, and thus descriptions of the other members will be omitted.

The control unit 310 overall controls each unit of the smartphone 300. The storage unit 320 stores various types of data and programs used for processing of the control unit 310. The control unit 310 turns on the display 302 and displays (presents) various information on the display 302 to a user according to an operation of the user. Further, the control unit 310 operates the illuminance sensor 1. The illuminance sensor 1 measures illuminance of light L, and outputs the measurement result to the control unit 310.

The control unit 310 adjusts luminance of the display 302 according to the illuminance measured by the illuminance sensor 1. For example, in a case where the illuminance of the light L is high, the control unit 310 increases luminance of the display 302. Further, in a case where the illuminance of the light L is low, the control unit 310 decrease luminance of the display 302.

In this way, by adjusting luminance of the display 302 according to the illuminance of the light L, it is possible to reduce the power consumption of the display 302 (smartphone 300). In addition, it is possible to improve visibility of a user in a case where the user visually recognizes an image displayed on the display 302.

Further, the illuminance sensor 1 also has a flicker detection function in addition to the illuminance detection function. Therefore, it is possible to detect a flicker without operating the camera 303 (that is, the image sensor).

For example, a case where a flicker is detected by the illuminance sensor 1 when the display 702 is turned on is considered. In this case, even when the camera 303 is not operated, the control unit 310 can change the exposure time of the camera 303 according to the flicker frequency detected by the illuminance sensor 1.

Further, in a case where a flicker state is changed (for example, in a case where a flicker state is changed from a flicker non-occurrence state to a flicker occurrence state), the illuminance sensor 1 can notify the control unit 310 of the fact based on the flicker determination result information. Therefore, even in a case where the flicker state is changed, the control unit 310 can change the exposure time of the camera 303 before the camera 303 is operated.

Accordingly, when the user of the smartphone 300 operates the camera 303 to take a picture, the exposure time of the camera can be set in advance to an optimal value according to the flicker state (flicker frequency). Therefore, the user can take an image with a constant quality regardless of the flicker state. That is, an influence of a flicker is reduced, and thus the user can take an image with a high quality.

Further, as described above, the smartphone 300 can detect a flicker by the illuminance sensor 1 without using the camera 303 (image sensor). Therefore, the power consumption of the smartphone 300 can be reduced, and thus a battery life time can be extended. That is, a time during which the user can use the smartphone 300 by one charge can be extended.

Embodiment 4

Figure 9:
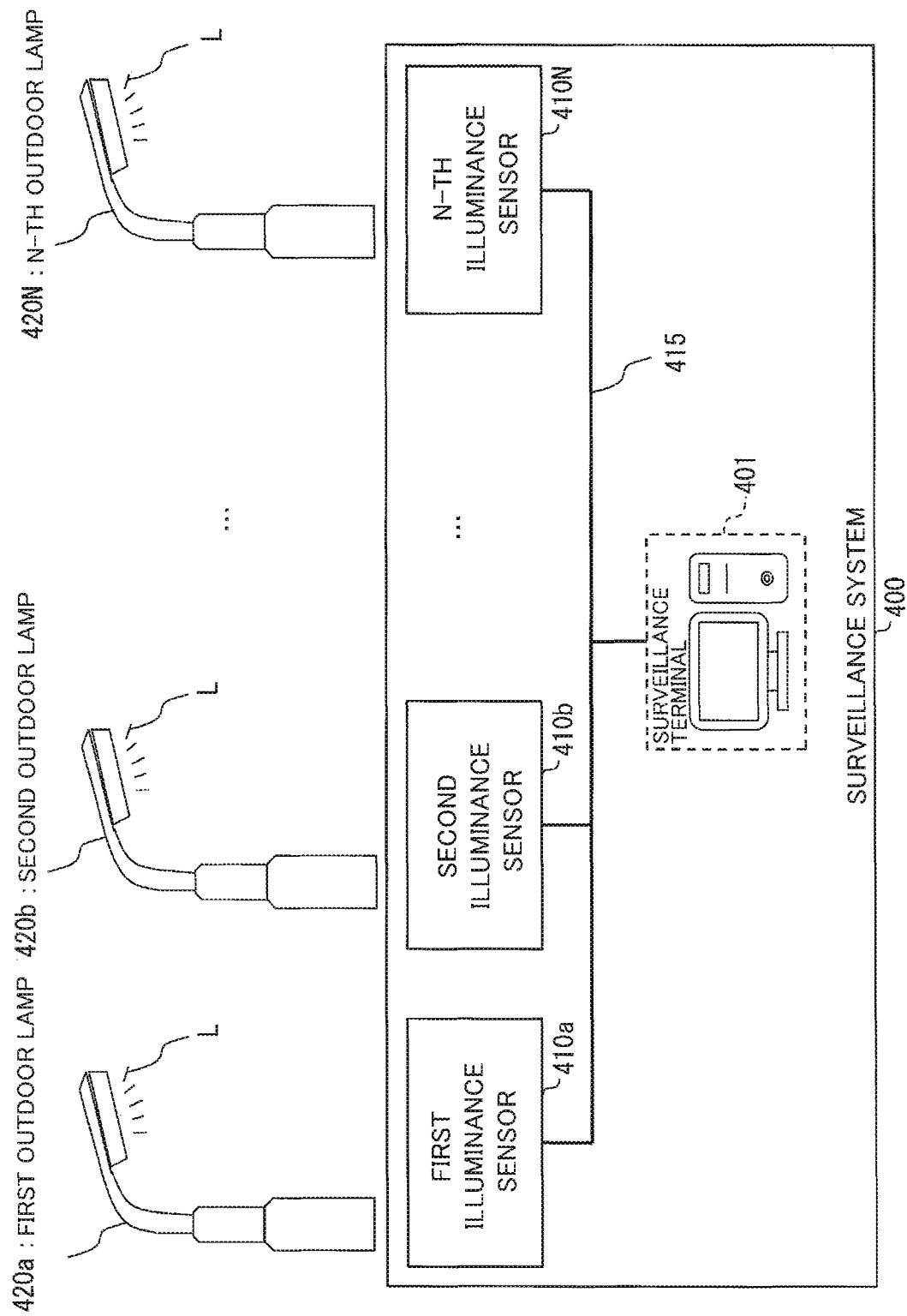
FIG. 9 is a functional block diagram illustrating a configuration of a main part of a surveillance system according to an embodiment 4.

An embodiment 4 will be described with reference to FIG. 9 as follows. FIG. 9 is a functional block diagram illustrating a configuration of a main part of a surveillance system 400 according to an embodiment 4.

The surveillance system 400 centrally surveils (i) lighting (outdoor lamps) provided on a public road or in a public park, (ii) lighting provided in a shared space such as an entrance or a hallway of an apartment building, and (iii) lighting provided in a passage in a hospital or a commercial facility.

Thus, the surveillance system 400 may be referred to as a lighting surveillance system. The surveillance system 400 surveils a life time or a replacement time of lighting, and notifies an administrator (user) of a surveillance result in a case where it is necessary to replace the lighting.

In such a place or a facility, a manager of lighting does not always surveil a state of lighting. For this reason, a fact that it is necessary to replace lighting may be discovered by (i) a notification from a resident living nearby a public road or a public park (ii) a notification from a resident of an apartment building, (iii) a notification from an employee or a user other than a manager of a hospital or a commercial facility, or (iv) a patrol by the manager himself/herself.

In particular, on a public road or in a public park or an apartment building, there may be a case where a manager is not present in the vicinity or a case where a manager does not frequently patrol the place. For this reason, even in a case where it is necessary to replace lighting, much time is required to replace lighting. In the worst case, there may be a case where the lighting may be left without being replaced. In such a situation, there is a concern that disadvantages such as security deterioration and inconvenience of a resident and a user may occur. The surveillance system 400 is configured to avoid such a problem. Hereinafter, a case where the surveillance system 400 centrally surveils a plurality of outdoor lamps provided on a public road or in a public park will be described as an example.

The surveillance system 400 includes a surveillance terminal 401, N illuminance sensors (a plurality of illuminance sensors), and a network 415. N is a natural number of two or more. For convenience of explanation, an i-th illuminance sensor is referred to as an i-th illuminance sensor. Here, i is a natural number satisfying 1≤i≤N. The surveillance terminal 401 overall controls each part of the surveillance system 400. The surveillance terminal 401 includes a storage unit (not illustrated) that stores various data and programs used for processing of the surveillance terminal 401.

In FIG. 9, for simplicity, only a first illuminance sensor 410a, a second illuminance sensor 410b, and an N-th illuminance sensor 410N are illustrated. The first illuminance sensor 410a to the N-th illuminance sensor 410N are all illuminance sensors according to an aspect of the present invention (for example, illuminance sensor 1).

At least one illuminance sensor among the plurality of illuminance sensors is provided for one outdoor lamp to be surveilled. Thus, at least as many illuminance sensors as the number of outdoor lamps are required. In the embodiment 4, a case where one illuminance sensor is provided for one outdoor lamp is described. That is, a case where there are N (the same number as the number of the illuminance sensors) outdoor lamps is considered.

For convenience of explanation, an i-th ordered outdoor lamp is referred to as an i-th outdoor lamp. In FIG. 9, for simplicity, only a first outdoor lamp 420a, a second outdoor lamp 420b, and an N-th outdoor lamp 420N are illustrated. In the embodiment 4, the i-th outdoor lamp is surveilled by the i-th illuminance sensor. Thus, for example, the first illuminance sensor 410a surveils the first outdoor lamp 420a. In addition, the N-th illuminance sensor 410N surveils the N-th outdoor lamp 420N.

For this reason, preferably, the i-th illuminance sensor is provided such that light L emitted from the i-th outdoor lamp can be received as uniformly as possible. Preferably, the i-th illuminance sensor is provided on the i-th outdoor lamp itself whenever possible. In a case where the i-th illuminance sensor is provided in this way, there is no obstacle that blocks the light L between the i-th illuminance sensor and the i-th outdoor lamp, and thus it is possible to perform surveillance with higher accuracy.

As illustrated in FIG. 9, each of the first illuminance sensor 410a to the N-th illuminance sensor 410N is connected to the surveillance terminal 401 via the network 415. The network 415 may be realized by a known communication network. The network 415 includes a wired communication network, a wireless communication network, a local area network (LAN), and a wide area network (WAN). The surveillance system 400 is configured in this way, and thus one surveillance terminal 401 can centrally surveil the first outdoor lamp 420a to the N-th outdoor lamp 420N (the plurality of outdoor lamps).

As an application example of the surveillance system 400, a case where each of the light sources of the first outdoor lamp 420a to the N-th outdoor lamp 420N is a light source in which a flicker does not occur during normal use (normal operation) (for example, an inverter-type fluorescent light) is considered.

When the i-th outdoor lamp is turned on, the i-th illuminance sensor starts to operate. The i-th illuminance sensor receives the light L emitted from the i-th illuminance sensor, detects illuminance of the light L, and detects the presence or absence of a flicker. In a case where the illuminance detected by the i-th outdoor lamp is within a prescribed range (within a range assumed during normal operation) and a flicker does not occur, in particular, the i-th illuminance sensor does not notify the surveillance terminal 401 of information.

Next, in a case where the illuminance of the light L emitted from the i-th outdoor lamp is not within the prescribed range due to a life time of the i-th outdoor lamp (in a case where the illuminance decreases), the i-th illuminance sensor transmits abnormality information indicating that the illuminance decreases (an abnormality occurs) to the surveillance terminal 401.

Further, it is assumed that a flicker occurs in the light L emitted from the i-th outdoor lamp due to the life time of the i-th outdoor lamp. When an occurrence of a flicker is detected, the i-th illuminance sensor transmits abnormality information indicating the detection to the surveillance terminal 401.

When the surveillance terminal 401 acquires the abnormality information from the i-th illuminance sensor, in order to confirm contents of the abnormality occurred in the i-th outdoor lamp in detail, the surveillance terminal 401 reads data stored in the i-th illuminance sensor (for example, data stored in the illuminance measurement storage device 14 and the flicker measurement storage device 15). The surveillance terminal 401 determines the necessity for replacement of the i-th outdoor lamp based on the data.

In a case where the surveillance terminal 401 determines that it is necessary to replace the i-th outdoor lamp, the surveillance terminal 401 may notify an administrator of the determination result. For example, the surveillance terminal 401 may transmit a message prompting replacement of the i-th outdoor lamp, to a mobile terminal owned by an administrator (or a computer provided in a management room) via a wireless communication network.

In a case where the i-th illuminance sensor does not have a function of notifying the surveillance terminal 401 of a state change of the light L (for example, a change in illuminance, a change in the presence or absence of a flicker), the surveillance terminal 401 may sequentially read detection results of the first illuminance sensor 410a to the N-th illuminance sensor 410N and confirm a state of the light L.

In the example, the light source in which a flicker does not occur in normal operation and a flicker occurs only in abnormal operation is used. On the other hand, the surveillance system 400 can also be applied to a light source in which a flicker occurs in normal operation.

For example, in a light source in which a flicker occurs in normal operation, a flicker frequency in normal operation is substantially constant. On the other hand, when the light source reaches the end of the life time, irregular changes in flicker frequency occur. Thus, when the i-th illuminance sensor has a function of specifying the flicker frequency, a change in flicker frequency of the light L can be detected. Therefore, a fact that a change in flicker frequency occurs due to the life time of the i-th outdoor lamp (light source) can be detected, and the surveillance terminal 401 can be notified of the fact.

As described above, as the illuminance sensor of the surveillance system 400, a camera (image sensor) may be used. On the other hand, by using the illuminance sensor according to the aspect of the present invention, the power consumption of the surveillance system 400 can be significantly reduced compared to a case where a camera is used. Further, a cost of the surveillance system 400 can be reduced.

Embodiment 5

Figure 10:
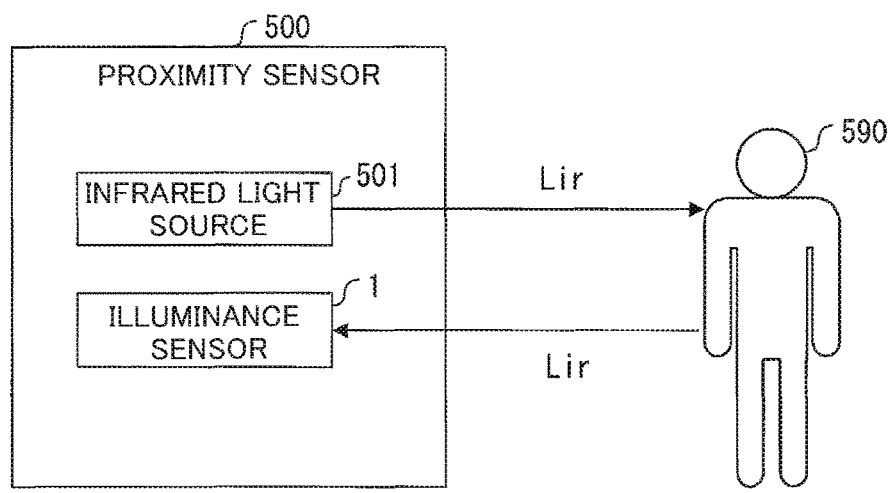
FIG. 10 is a functional block diagram illustrating a configuration of a main part of a proximity sensor according to an embodiment 5.

An embodiment 5 will be described with reference to FIG. 10 as follows. FIG. 10 is a functional block diagram illustrating a configuration of a main part of a proximity sensor 500 according to an embodiment 5.

The proximity sensor 500 detects that an object 590 (for example, a person) approaches the proximity sensor 500. The proximity sensor 500 includes an illuminance sensor 1 and an infrared light source 501. On the other hand, the illuminance sensor 2 according to the embodiment 2 may be provided in the proximity sensor 500.

The infrared light source 501 emits infrared light Lir. In a case where the object 590 is located in the vicinity of the proximity sensor 500, the infrared light Lir emitted from the infrared light source 501 is reflected by the object 590, and travels toward the proximity sensor 500.

The illuminance sensor 1 detects (receives) the infrared light Lir as reflected light (the infrared light Lir which is reflected by the object 590 and travels toward the proximity sensor 500). In a case where the illuminance sensor 1 (control circuit 11) detects the infrared light Lir, the illuminance sensor 1 determines that the object approaches.

As described above, the illuminance sensor according to the aspect of the present invention may be used as a light receiving unit of the proximity sensor 500. According to the proximity sensor 500, it is possible to realize a proximity sensor that further has an illuminance detection function and a flicker detection function in addition to a proximity detection function. In other words, a proximity detection function can be further added to the illuminance sensor according to the aspect of the present invention.

The proximity sensor 500 may be provided as an illuminance sensor of the smartphone 300 or the surveillance system 400. As an example, in the smartphone 300, there are many cases where a proximity sensor is provided for operation control (for example, turn-on control) of the display 1005. In a case where the proximity sensor 500 is provided in the smartphone 300, it is not necessary to separately provide an illuminance sensor and a proximity sensor, and thus the number of components of the smartphone 300 can be reduced.

Further, in a case where the proximity sensor 500 is provided in the surveillance system 400, for example, the presence of a suspicious person can be detected, and thus the configuration is useful from a viewpoint of crime prevention.

[Implementation Example by Software]

The control blocks (particularly, the control circuit 11 and the flicker detection circuit 16) of the illuminance sensors 1 and 2, the smartphone 300, and the surveillance system 400 may be realized by a logic circuit (hardware) formed using an integrated circuit (IC chip) and the like, or may be realized by software using a central processing unit (CPU).

In the latter case, the illuminance sensors 1 and 2, the smartphone 300, and the surveillance system 400 may include a CPU that executes instructions of a program as software for realizing each function, a read only memory (ROM) or a storage device in which the program and various data are recorded so as to be readable by a computer (or CPU) (referred to as a "recording medium"), a random access memory (RAM) for loading the program, and the like. The computer (or CPU) reads the program from the recording medium and executes the program, and thus the object according to the aspect of the present invention is achieved. As the recording medium, a "non-temporary tangible medium" such as a tape, a disk, a card, a semiconductor memory, a programmable logic circuit, or the like may be used. Further, the program may be supplied to the computer via a certain transmission medium (a communication network or a broadcast wave) that can transmit the program. In the aspect of the present invention, the program may also be realized in a form of a data signal which is embodied by electronic transmission and is embedded on a carrier wave.

SUMMARY

An illuminance sensor (1) according to an aspect 1 of the present invention is an illuminance sensor that detects illuminance of light (L), the illuminance sensor (1) including: a light receiving unit (12) that receives the light and outputs an electrical signal (current Iin); a first counter (a flicker measurement counter circuit 135) that performs AD conversion on the electrical signal and outputs a first digital signal as an index of a flicker of the light; a second counter (an illuminance measurement counter circuit 134) that performs AD conversion on the electrical signal and outputs a second digital signal as an index of illuminance of the light; a first storage unit (a flicker measurement storage device 15) that stores the first digital signal output from the first counter; a second storage unit (an illuminance measurement storage device 14) that stores the second digital signal output from the second counter; and a flicker detection unit (16) that detects an occurrence of the flicker by analyzing the first digital signal stored in the first storage unit, in which a cycle during which the first digital signal is output from the first counter is shorter than a cycle during which the second digital signal is output from the second counter.

According to this configuration, it is possible to detect illuminance by the second digital signal. Further, it is possible to detect an occurrence of a flicker by causing the flicker detection unit to analyze the first digital signal. Therefore, processing of detecting illuminance and processing of detecting a flicker can be performed in parallel.

Further, the flicker detection unit can detect an occurrence of a flicker by reading the first digital signal stored in the first storage unit. Therefore, unlike the illuminance sensor in the related art, it is possible to reduce a possibility of failure in reading of data (first digital signal) used to detect an occurrence of a flicker.

Further, as described above, a flicker is a phenomenon that changes faster (has a higher frequency) than illuminance recognized by human eyes changes. The cycle during which the first digital signal is output (the flicker measurement time T2) is set to be shorter than the cycle during which the second digital signal is output (the illuminance measurement time T1), and thus the first digital signal is data with a higher frequency than the frequency of the second digital signal. Therefore, the first digital signal is suitable as an index of a flicker. As described above, according to the illuminance sensor of the aspect of the present invention, it is possible to detect a flicker with higher accuracy than in the related art.

In the illuminance sensor according to an aspect 2 of the present invention, in the aspect 1, preferably, the number of bits (N2) of the first digital signal is smaller than the number of bits (N1) of the second digital signal.

As described above, the flicker measurement time T2 (the cycle during which the first digital signal is output from the first counter) and the illuminance measurement time T1 (the cycle during which the second digital signal is output from the second counter) are respectively determined by the number of bits of the first digital signal and the number of bits of the second digital signal.

According to this configuration, the number of bits of the first digital signal is smaller than the number of bits of the second digital signal, and thus it is possible to set the flicker measurement time T2 to be shorter than the illuminance measurement time T1.

In the illuminance sensor according to an aspect 3 of the present invention, in the aspect 1 or 2, preferably, the first counter is initialized in a shorter cycle than the second counter is.

According to this configuration, it is possible to more reliably detect a flicker.

In the illuminance sensor according to an aspect 4 of the present invention, in any one of the aspects 1 to 3, preferably, the flicker detection unit determines that the flicker occurs in a case where a difference (an amplitude A) between a global maximum value (MM) and a global minimum value (ML) of the first digital signal is equal to or larger than a prescribed first threshold value (an amplitude threshold value Ath).

According to this configuration, it is possible to detect a flicker using the difference between the global maximum value and the global minimum value of the first digital signal.

In the illuminance sensor according to an aspect 5 of the present invention, in the aspect 4, preferably, the flicker detection unit sets the first threshold value based on an average value (Mm) of the first digital signal.

According to this configuration, it is possible to improve accuracy of flicker detection by setting the first threshold value according to the average value of the first digital signal.

In the illuminance sensor according to an aspect 6 of the present invention, in the aspect 4 or 5, preferably, the flicker detection unit determines a flicker frequency as a frequency of the flicker based on a time interval (F) between a local maximum point (for example, $M_{MAX\_1}$) and a local minimum point (for example, $M_{MIN\_1}$) adjacent to each other in the first digital signal.

According to this configuration, it is possible to further specify the flicker frequency in a case where an occurrence of a flicker is detected.

In the illuminance sensor according to an aspect 7 of the present invention, in the aspect 6, preferably, the flicker detection unit determines that the flicker frequency is a first flicker frequency (for example, 100 Hz) in a case where the time interval is equal to or larger than a prescribed second threshold value, the flicker detection unit determines that the flicker frequency is a second flicker frequency (for example, 120 Hz) in a case where the time interval is smaller than the second threshold value, and the second flicker frequency is higher than the first flicker frequency.

According to this configuration, it is possible to more specifically specify the flicker frequency.

An illuminance sensor (2) according to an aspect 8 of the present invention is an illuminance sensor that detects illuminance of light, the illuminance sensor (2) including: a light receiving unit that receives the light and outputs an electrical signal; a first counter that performs AD conversion on the electrical signal and outputs a first digital signal as an index of a flicker of the light; a second counter that performs AD conversion on the electrical signal and outputs a second digital signal as an index of illuminance of the light; a first storage unit that stores the first digital signal output from the first counter; a second storage unit that stores the second digital signal output from the second counter; and an output unit that outputs the first digital signal stored in the first storage unit to the outside of the illuminance sensor, in which a cycle during which the first digital signal is output from the first counter is shorter than a cycle during which the second digital signal is output from the second counter.

According to this configuration, the output unit can output the first digital signal stored in the first storage unit, for example, to a processor outside the illuminance sensor (for example, a processor of an electronic device). Therefore, when the processor has a function of a flicker detection unit, an occurrence of a flicker can be detected by the processor.

As described above, in the illuminance sensor according to the aspect of the present invention, a flicker detection unit is not necessarily provided. Even in the illuminance sensor with the configuration, the same effects as those of the aspect 1 are obtained.

A proximity sensor (500) according to an aspect 9 of the present invention includes the illuminance sensor according to any one of the aspects 1 to 8 and an infrared light source (501) that emits infrared light (Lir). Preferably, the illuminance sensor receives the infrared light emitted from the infrared light source and reflected by an object (590).

According to this configuration, a proximity detection function can be further added to the illuminance sensor according to the aspect of the present invention.

Preferably, an electronic device (a smartphone 300) according to an aspect 10 of the present invention includes (i) the illuminance sensor according to any one of the aspects 1 to 8 or (ii) the proximity sensor according to the aspect 9.

According to this configuration, the same effects as those of the illuminance sensor according to the aspect of the present invention are obtained.

A surveillance system (400) according to an aspect 11 of the present invention includes: (i) the illuminance sensor according to any one of the aspects 1 to 8 or (ii) the proximity sensor according to the aspect 9; a surveillance terminal (401); and a network (415) that connects the surveillance terminal and the illuminance sensor or the proximity sensor.

According to this configuration, the same effects as those of the illuminance sensor according to the aspect of the present invention are obtained. As described above, the surveillance system may be used as a lighting surveillance system that centrally surveils a plurality of light sources (for example, the first outdoor lamp 420a to the N-th outdoor lamp 420N).

APPENDIX

The present invention is not limited to the above-described embodiments, and various modifications may be made within the scope described in the claims. Also, an embodiment obtained by appropriately combining each technical means disclosed in different embodiments falls within a technical scope of the present invention. Furthermore, by combining technical means disclosed in each embodiment, a new technical feature may be formed.

Other Representations of Aspects of Present Invention

The aspects of the present invention may also be represented as follows.

An illuminance sensor according to an aspect of the present invention includes: a light receiving element that outputs an electrical signal according to ambient brightness; an AD conversion circuit that converts the electrical signal output from the light receiving element into a first digital signal and a second digital signal; a first storage device that stores the first digital signal output from the AD conversion circuit; an analysis circuit that analyzes the first digital signal stored in the first storage device; a second storage device that stores the second digital signal output from the AD conversion circuit; and a control circuit that controls the circuit group. The AD conversion circuit sequentially outputs the first digital signal to the first storage device at the same time interval for one measurement, and the first storage device stores the first digital signals which are sequentially input in areas different from each other under the control of the control circuit. On the other hand, the second digital signal is output from the AD conversion circuit to the second storage device when a measurement period is ended, and the second storage device stores the second digital signal which is input under the control of the control circuit. The sum of values of the first digital signals stored in the first storage device is equal to a value of the second digital signal. The analysis circuit analyzes the first digital signal stored in the first storage device. Thereby, the presence or absence of blinking of an ambient light source depending on an AC power source frequency is determined, and a frequency of blinking of the light source is specified. Therefore, average brightness of the ambient light source and the presence or absence of blinking of the light source are determined by one measurement.

Further, in the illuminance sensor according to the aspect of the present invention, the light receiving element is a photodiode.

Further, in the illuminance sensor according to the aspect of the present invention, the light receiving element is configured with a plurality of light receiving elements having spectral sensitivity characteristics different from each other.

Further, in the illuminance sensor according to the aspect of the present invention, the AD conversion circuit includes an integration circuit, a comparison circuit, a discharge circuit, a first counter circuit, and a second counter circuit, and the first counter circuit is initialized in a shorter time than the second counter circuit is.

Further, in the illuminance sensor according to the aspect of the present invention, the first storage device is a volatile semiconductor memory device.

Further, in the illuminance sensor according to the aspect of the present invention, the volatile semiconductor memory device is an SRAM.

Further, in the illuminance sensor according to the aspect of the present invention, the analysis circuit determines the presence or absence of blinking of the light source based on an amplitude of the first digital signal stored in the first storage device, and specifies a frequency of blinking of the light source by analyzing a time interval between a local maximum value and a local minimum value of the first digital signal in a case where blinking of the light source is detected.

Further, in the illuminance sensor according to the aspect of the present invention, the analysis circuit determines the presence or absence of blinking of the light source based on an amplitude of the first digital signal stored in the first storage device, and specifies a frequency of blinking of the light source by performing Fourier transform on the first digital signal in a case where blinking of the light source is detected.

Further, an illuminance sensor according to another aspect of the present invention includes: a light receiving element that outputs an electrical signal according to ambient brightness; an AD conversion circuit that converts the electrical signal output from the light receiving element into a digital signal; a first storage device that stores a first digital signal output from the AD conversion circuit; a second storage device that stores a second digital signal output from the AD conversion circuit; and a control circuit that controls the circuit group. The AD conversion circuit sequentially outputs the first digital signal to the first storage device at the same time interval for one measurement, and the first storage device stores the first digital signals which are sequentially input in areas different from each other. On the other hand, the second digital signal is output from the AD conversion circuit to the second storage device when a measurement period is ended, and the second storage device stores the second digital signal which is input. The sum of values of the first digital signals stored in the first storage device is equal to a value of the second digital signal. All of the first digital signals stored in the first storage device are output to the outside via the control circuit.

Further, in the illuminance sensor according to the aspect of the present invention, the light receiving element is a photodiode.

Further, in the illuminance sensor according to the aspect of the present invention, the light receiving element is configured with a plurality of light receiving elements having spectral sensitivity characteristics different from each other.

Further, in the illuminance sensor according to the aspect of the present invention, the AD conversion circuit includes an integration circuit, a comparison circuit, a discharge circuit, a first counter circuit, and a second counter circuit, and the first counter circuit is initialized in a shorter time than the second counter circuit is.

Further, in the illuminance sensor according to the aspect of the present invention, the first storage device is a volatile semiconductor memory device.

Further, in the illuminance sensor according to the aspect of the present invention, the volatile semiconductor memory device is an SRAM.

Further, a proximity illuminance sensor according to still another aspect of the present invention has a function of the illuminance sensor according to the aspect of the present invention and a proximity sensor function of detecting the presence or absence of an object at a short distance by reflected light of infrared light emitted from a light source.

Further, an electronic device according to still another aspect of the present invention includes the proximity illuminance sensor or the proximity illuminance sensor according to the aspect of the present invention.

Further, a surveillance system according to still another aspect of the present invention includes the proximity illuminance sensor or the proximity illuminance sensor according to the aspect of the present invention, and is connected to a surveillance terminal via a network.

REFERENCE SIGNS LIST 1, 2 ILLUMINANCE SENSOR
11 CONTROL CIRCUIT (OUTPUT UNIT)
12 LIGHT RECEIVING UNIT
13 AD CONVERTER CIRCUIT (AD CONVERTER UNIT)
14 ILLUMINANCE MEASUREMENT STORAGE DEVICE (SECOND STORAGE UNIT)
15 FLICKER MEASUREMENT STORAGE DEVICE (FIRST STORAGE UNIT)
16 FLICKER DETECTION CIRCUIT (FLICKER DETECTION UNIT)

134 ILLUMINANCE MEASUREMENT COUNTER CIRCUIT (SECOND COUNTER)
135 FLICKER MEASUREMENT COUNTER CIRCUIT (FIRST COUNTER)
300 SMARTPHONE (ELECTRONIC DEVICE)
400 SURVEILLANCE SYSTEM
401 SURVEILLANCE TERMINAL
410a FIRST ILLUMINANCE SENSOR (ILLUMINANCE SENSOR)
410b SECOND ILLUMINANCE SENSOR (ILLUMINANCE SENSOR)
410N N-TH ILLUMINANCE SENSOR (ILLUMINANCE SENSOR)
415 NETWORK
500 PROXIMITY SENSOR
501 INFRARED LIGHT SOURCE
590 OBJECT
L LIGHT
Lir INFRARED LIGHT
Iin CURRENT (ELECTRICAL SIGNAL)
T1 ILLUMINANCE MEASUREMENT TIME (CYCLE DURING WHICH SECOND DIGITAL SIGNAL IS OUTPUT FROM SECOND COUNTER)
T2 FLICKER MEASUREMENT TIME (CYCLE DURING WHICH FIRST DIGITAL SIGNAL IS OUTPUT FROM FIRST COUNTER)
N1 THE NUMBER OF BITS OF ILLUMINANCE MEASUREMENT OUTPUT DIGITAL VALUE (THE NUMBER OF BITS OF SECOND DIGITAL SIGNAL)
N2 THE NUMBER OF BITS OF FLICKER MEASUREMENT OUTPUT DIGITAL VALUE (THE NUMBER OF BITS OF FIRST DIGITAL SIGNAL)
MM MAXIMUM VALUE OF SAMPLE DATA (MAXIMUM VALUE OF FIRST DIGITAL SIGNAL)
ML MINIMUM VALUE OF SAMPLE DATA (MINIMUM VALUE OF FIRST DIGITAL SIGNAL)
Mm AVERAGE VALUE OF SAMPLE DATA (AVERAGE VALUE OF FIRST DIGITAL SIGNAL)
A AMPLITUDE OF SAMPLE DATA (DIFFERENCE BETWEEN MAXIMUM VALUE AND MINIMUM VALUE OF FIRST DIGITAL SIGNAL)
Ath AMPLITUDE THRESHOLD VALUE (FIRST THRESHOLD VALUE)
$M_{MAX\_1}$, $M_{MAX\_2}$, $M_{MAX\_3}$ MAXIMUM POINT OF SAMPLE DATA (MAXIMUM POINT OF FIRST DIGITAL SIGNAL)
$M_{MIN\_1}$, $M_{MIN\_2}$, $M_{MIN\_3}$ MINIMUM POINT OF SAMPLE DATA (MINIMUM POINT OF FIRST DIGITAL SIGNAL)
F TIME INTERVAL BETWEEN MAXIMUM POINT AND MINIMUM POINT CONTIGUOUS TO EACH OTHER IN FIRST DIGITAL SIGNAL
Fth TIME THRESHOLD VALUE (SECOND THRESHOLD VALUE)

The invention claimed is:

1. An illuminance sensor that detects illuminance of light, the illuminance sensor comprising:
a light receiving unit that receives the light and outputs an electrical signal;
a first counter that performs AD conversion on the electrical signal and outputs a first digital signal as an index of a flicker of the light;
a second counter that performs AD conversion on the electrical signal and outputs a second digital signal as an index of illuminance of the light;
a first storage unit that stores the first digital signal output from the first counter;
a second storage unit that stores the second digital signal output from the second counter; and
a flicker detection unit that detects an occurrence of the flicker by analyzing the first digital signal stored in the first storage unit,
wherein a cycle during which the first digital signal is output from the first counter is shorter than a cycle during which the second digital signal is output from the second counter.

2. The illuminance sensor according to claim 1, wherein the number of bits of the first digital signal is smaller than the number of bits of the second digital signal.

3. The illuminance sensor according to claim 1, wherein the first counter is initialized in a shorter cycle than the second counter is.

4. The illuminance sensor according to claim 1, wherein the flicker detection unit determines that the flicker occurs in a case where a difference between a global maximum value and a global minimum value of the first digital signal is equal to or larger than a prescribed first threshold value.

5. The illuminance sensor according to claim 4, wherein the flicker detection unit sets the first threshold value based on an average value of the first digital signal.

6. The illuminance sensor according to claim 4, wherein the flicker detection unit determines a flicker frequency as a frequency of the flicker based on a time interval between a local maximum and a local minimum contiguous to each other in the first digital signal.

7. The illuminance sensor according to claim 6, wherein the flicker detection unit determines that the flicker frequency is a first flicker frequency in a case where the time interval is equal to or larger than a prescribed second threshold value,
wherein the flicker detection unit determines that the flicker frequency is a second flicker frequency in a case where the time interval is smaller than the second threshold value, and
wherein the second flicker frequency is higher than the first flicker frequency.

8. A proximity sensor comprising:
the illuminance sensor according to claim 1; and
an infrared light source that emits infrared light,
wherein the illuminance sensor receives the infrared light emitted from the infrared light source and reflected by an object.

9. An electronic device comprising the proximity sensor according to claim 8.

10. A surveillance system comprising:
the proximity sensor according to claim 8;
a surveillance terminal; and
a network that connects the surveillance terminal and the illuminance sensor or the proximity sensor.

11. An electronic device comprising the illuminance sensor according to claim 1.

12. A surveillance system comprising:
the illuminance sensor according to claim 1;
a surveillance terminal; and
a network that connects the surveillance terminal and the illuminance sensor or the proximity sensor.

13. An illuminance sensor that detects illuminance of light, the illuminance sensor comprising:

a light receiving unit that receives the light and outputs an electrical signal;
a first counter that performs AD conversion on the electrical signal and outputs a first digital signal as an index of a flicker of the light;
a second counter that performs AD conversion on the electrical signal and outputs a second digital signal as an index of illuminance of the light;
a first storage unit that stores the first digital signal output from the first counter;
a second storage unit that stores the second digital signal output from the second counter; and
an output unit that outputs the first digital signal stored in the first storage unit to outside of the illuminance sensor,
wherein a cycle during which the first digital signal is output from the first counter is shorter than a cycle during which the second digital signal is output from the second counter.

* * * * *